US012810795B2

(12) United States Patent
Lee et al.

(10) Patent No.: US 12,810,795 B2
(45) Date of Patent: Nov. 24, 2026

(54) DISPLAY PANEL AND DISPLAY DEVICE INCLUDING THE SAME

(71) Applicant: LG Display Co., Ltd., Seoul (KR)

(72) Inventors: Dong Kyu Lee, Paju-si (KR); Seung Tae Jin, Paju-si (KR); Guen Sik Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/910,882

(22) Filed: Oct. 9, 2024

(65) Prior Publication Data

US 2025/0140188 A1 May 1, 2025

(30) Foreign Application Priority Data

Oct. 26, 2023 (KR) ........................ 10-2023-0144549

(51) Int. Cl.
*G09G 3/3233* (2016.01)
*G09G 3/00* (2006.01)

(52) U.S. Cl.
CPC ........... *G09G 3/3233* (2013.01); *G09G 3/035* (2020.08); *G09G 2300/0819* (2013.01); *G09G 2300/0852* (2013.01); *G09G 2300/0861* (2013.01); *G09G 2310/08* (2013.01); *G09G 2320/068* (2013.01)

(58) Field of Classification Search
CPC ................. G09G 3/3233; G09G 3/035; G09G 2300/0819; G09G 2300/0852; G09G 2300/0861; G09G 2310/08; G09G 2320/068
See application file for complete search history.

(56) References Cited

U.S. PATENT DOCUMENTS

| | | | | |
|---|---|---|---|---|
| 10,192,475 | B2 | 1/2019 | Ju et al. | |
| 10,672,346 | B2 | 6/2020 | Kang | |
| 11,996,046 | B2 | 5/2024 | Kim et al. | |
| 2012/0069256 | A1 | 3/2012 | Huang et al. | |
| 2018/0122292 | A1 * | 5/2018 | Ju | G09G 3/2092 |
| 2023/0326401 | A1 | 10/2023 | Won et al. | |
| 2024/0420640 | A1 * | 12/2024 | Hwang | G09G 3/32 |

FOREIGN PATENT DOCUMENTS

| | | | |
|---|---|---|---|
| CN | 113282175 | A | 8/2021 |
| KR | 10-2019-0017501 | A | 2/2019 |
| KR | 20190038148 | A | 4/2019 |
| KR | 20230036763 | A | 3/2023 |

* cited by examiner

*Primary Examiner* — Dennis P Joseph
(74) *Attorney, Agent, or Firm* — Seed Intellectual Property Law Group LLP

(57) ABSTRACT

The present disclosure relates to a display panel and a display device including the same, which include a first mode selection circuit that receives a first mode selection voltage through a first data line to select a first viewing angle as the viewing angle of one or more sub-pixels, and a second mode selection circuit that receives a second mode selection voltage through a second data line to select a second viewing angle as the viewing angle of one or more sub-pixels.

4 Claims, 23 Drawing Sheets

DISPLAY PANEL AND DISPLAY DEVICE INCLUDING THE SAME

CROSS-REFERENCE TO RELATED APPLICATION

This application claims priority to and the benefit of Korean Patent Application No. 10-2023-0144549, filed on Oct. 26, 2023, the disclosure of which is incorporated herein by reference in its entirety.

BACKGROUND

Technical Field

The present disclosure relates to a display panel whose viewing angle is variable on a pixel basis and a display device including the same.

Description of the Related Art

Variable viewing angle technology is being applied to display devices. Variable viewing angle technology may present video content or visual information reproduced on a display device only to a user within a narrow viewing angle range, or to multiple users within a wide viewing angle range.

As the market for future vehicles such as electric vehicles and self-driving cars expands, demand for vehicle display devices is rapidly increasing. Research is being conducted on a method of dividing the screen of a vehicle display device and controlling one part of the screen to have a narrow viewing angle and the other part to have a wide viewing angle. This technology may drive pixels with a narrow viewing angle arranged in one area of the screen to display personal contents or information that only a specific user may view, and simultaneously drive pixels with a wide viewing angle arranged in the other area of the screen to display shared contents that multiple users may view together.

In vehicle display devices, display panels for organic light emitting display devices are attracting attention. An organic light emitting display device includes an organic light emitting diode (hereinafter, referred to as "OLED") that emits light by itself, and has an advantage in that the response speed is fast, the luminous efficiency and luminance are good, and the viewing angle is wide. The organic light emitting display device has a fast response speed, is excellent in terms of luminous efficiency, luminance and viewing angle, and provides an excellent contrast ratio and color reproducibility since it may express the black grayscale in complete black. Because the display panel of an organic light emitting display device may be flexibly bent, it may easily implement a curved surface. Due to these advantages, the share of organic light emitting display devices in the vehicle display device market is rapidly increasing.

BRIEF SUMMARY

The inventors recognized that to implement variable viewing angle technology, wiring that transmits signals for selecting the viewing angle in the pixels of the display panel, circuit elements, optical elements, etc., may be added. If many wires and circuit elements are added to the display panel, the design of the display panel becomes difficult and the cost of the display device increases The present disclosure has been made in an effort to, among others, address aforementioned drawbacks.

The present disclosure provides a display device whose viewing angle may be selected on a pixel basis.

The problems or limitations to be solved or addressed by the present disclosure are not limited to those mentioned above, and other problems or limitations not mentioned will be clearly understood by those skilled in the art from the following description.

A display panel according to one embodiment of the present disclosure includes: a first mode selection circuit that receives a first mode selection voltage through a first data line to select a first viewing angle as the viewing angle of one or more sub-pixels; and a second mode selection circuit that receives a second mode selection voltage through a second data line to select a second viewing angle as the viewing angle of one or more sub-pixels.

The display panel may further include a plurality of sub-pixels. Each of the sub-pixels may include: a first light-emitting element; a second light-emitting element; a driving element that drives the first and second light-emitting elements; a compensation circuit including a first capacitor connected to the driving element; a first switch element that is electrically connected to the driving element and the first light-emitting element and is driven by the first mode selection voltage; and a second switch element that is electrically connected to the driving element and the second light-emitting element and is driven by the second mode selection voltage.

A first sub-pixel may include the first mode selection circuit. A second sub-pixel may include the second mode selection circuit. The first mode selection circuit is electrically connected to the first data line and the compensation circuit inside the first sub-pixel to supply the first mode selection voltage to gate electrodes of the first switch elements arranged in the first and second sub-pixels. The second mode selection circuit is electrically connected to the second data line and the compensation circuit inside the second sub-pixel to supply the second mode selection voltage to gate electrodes of the second switch elements arranged in the first and second sub-pixels.

The first mode selection circuit may include a second capacitor to which the first mode selection voltage is applied. The second mode selection circuit may include a third capacitor to which the second mode selection voltage is applied.

The first mode selection circuit includes a first mode switch element electrically connected to the first data line, a second capacitor that is connected to gate electrodes of the first switch elements arranged in the first and second sub-pixels to receive the first mode selection voltage being applied, and a second mode switch element connected between the first mode switch element and the second capacitor. The second mode selection circuit may include a third mode switch element electrically connected to the second data line, a third capacitor that is connected to gate electrodes of the second switch elements arranged in the first and second sub-pixels to receive the second mode selection voltage being applied, and a fourth mode switch element connected between the third mode switch element and the third capacitor.

The first light-emitting element may emit light when the first switch element is turned on in response to a gate-on voltage of the first mode selection voltage. The second light-emitting element may emit light when the second switch element is turned on in response to a gate-on voltage of the second mode selection voltage. The first switch element may be turned off according to a gate-off voltage of the first mode selection voltage. The second switch element may be turned off according to a gate-off voltage of the second mode selection voltage.

The display panel may further include: a first-first MUX switch element that is connected to the first data line to supply the first mode selection voltage to the first data line; a first-second MUX switch element that is connected to the first data line to supply a first data voltage to be charged in the first capacitor of the first sub-pixel to the first data line; a second-first MUX switch element that is connected to the second data line to supply the second mode selection voltage to the second data line; and a second-second MUX switch element that is connected to the second data line to supply a second data voltage to be charged in the first capacitor of the second sub-pixel to the second data line.

After the first-first MUX switch element and the second-first MUX switch element may be simultaneously turned on in response to a gate-on voltage of a first MUX signal, the first-second MUX switch element and the second-second MUX switch element may be simultaneously turned on in response to a gate-on voltage of a second MUX signal.

The display panel may further include a third sub-pixel and a fourth sub-pixel. The first mode selection circuit may be connected to the first data line, the compensation circuit of the first sub-pixel, and gate electrodes of the first switch elements of the first to fourth sub-pixels. The second mode selection circuit may be connected to the second data line, the compensation circuit of the second sub-pixel, and gate electrodes of the first switch elements of the first to fourth sub-pixels.

Each of the first to fourth sub-pixels may include: a driving element including a first electrode connected to a first node to which a pixel driving voltage is applied, a gate electrode connected to a second node, and a second electrode connected to a third node; a third switch element including a first electrode connected to a fourth node, a gate electrode to which a first gate signal is applied, and a second electrode connected to a fifth node; a fourth switch element including a first electrode connected to the second node, a gate electrode to which a second gate signal is applied, and a second electrode connected to the third node; a fifth switch element including a first electrode to which a reference voltage is applied, a gate electrode to which the second gate signal is applied, and a second electrode connected to a ninth node; a sixth switch element including a first electrode to which the reference voltage is applied, a gate electrode to which the second gate signal is applied, and a second electrode connected to a tenth node; a seventh switch element including a first electrode connected to the fifth node, a gate electrode to which a third gate signal is applied, and a second electrode to which the reference voltage is applied; and an eighth switch element including a first electrode connected to the third node, a gate electrode to which the third gate signal is applied, and a second electrode connected to the eighth node.

In each of the first to fourth sub-pixels, the first switch element may include a first electrode connected to the eighth node, a gate electrode connected to the sixth node to which the first mode selection voltage is applied, and a second electrode connected to the ninth node. The second switch element may include a first electrode connected to the eighth node, a gate electrode connected to the seventh node to which the second mode selection voltage is applied, and a second electrode connected to the tenth node. The first light-emitting element may include an anode electrode connected to the ninth node and a cathode electrode to which a cathode voltage is applied. The second light-emitting element may include an anode electrode connected to the tenth node and a cathode electrode to which a cathode voltage is applied. The first capacitor may be connected between the second node and the fifth node.

The first mode switch element and the second mode switch element may be connected in series between the fourth node and the sixth node. The third mode switch element and the fourth mode switch element may be connected in series between the fourth node and the seventh node. The second capacitor may be connected between the sixth node and the reference voltage or between the sixth node and the pixel driving voltage. The third capacitor may be connected between the seventh node and the reference voltage or between the seventh node and the pixel driving voltage.

The first mode switch element may include a first electrode connected to the fourth node of the first sub-pixel, a gate electrode to which the third gate signal is applied, and a second electrode connected to the eleventh node of the first sub-pixel. The second mode switch element may include a first electrode connected to the eleventh node of the first sub-pixel, a gate electrode to which the second gate signal is applied, and a second electrode connected to the sixth node. The third mode switch element may include a first electrode connected to the fourth node of the second sub-pixel, a gate electrode to which the third gate signal is applied, and a second electrode connected to the twelfth node of the second sub-pixel. The fourth mode switch element may include a first electrode connected to the twelfth node of the second sub-pixel, a gate electrode to which the second gate signal is applied, and a second electrode connected to the seventh node.

The first-first MUX switch element may include a first electrode to which the first mode selection voltage is applied, a gate electrode to which the first MUX signal is applied, and a second electrode connected to the first data line. The first-second MUX switch element may include a first electrode to which the first data voltage is applied, a gate electrode to which the second MUX signal is applied, and a second electrode connected to the first data line. The second-first MUX switch element may include a first electrode to which the second mode selection voltage is applied, a gate electrode to which the first MUX signal is applied, and a second electrode connected to the second data line. The second-second MUX switch element may include a first electrode to which the second data voltage is applied, a gate electrode to which the second MUX signal is applied, and a second electrode connected to the second data line.

A voltage of the first MUX signal may be the gate-on voltage during a first period, the gate-off voltage during a second-first period set after the first period, the gate-off voltage during a second-second period set after the second-first period, and the gate-off voltage during a third period set after the second-second period. A voltage of the second MUX signal may be the gate-off voltage during the first period, the gate-on voltage during the second-first period, the gate-off voltage during the second-second period, and the gate-off voltage during the third period. The first gate signal may be the gate-off voltage during the first period and second-first period, the gate-on voltage during the second-second period, and the gate-off voltage during the third period. The second gate signal may be the gate-on voltage during the first to second-second periods, and the gate-off voltage during the third period. The third gate signal may be the gate-on voltage during the first period, the gate-off voltage during the second-first and second-second periods, and the gate-on voltage during the third period.

A display panel according to another embodiment of the present disclosure includes: a first sub-pixel connected to a first data line; a second sub-pixel connected to a second data line; a third sub-pixel connected to a third data line; a fourth sub-pixel connected to a fourth data line; a first mode selection circuit configured to receive a first mode selection voltage through one of the first to fourth data lines to select a first viewing angle as a viewing angle of the first to fourth sub-pixels; and a second mode selection circuit configured to receive a second mode selection voltage through another one of the first to fourth data lines to select a second viewing angle as the viewing angle of the first to fourth sub-pixels.

The display panel may further include a first-first MUX switch element that is connected to the first data line to supply the first mode selection voltage to the first data line; a first-second MUX switch element that is connected to the first data line to supply a first data voltage to be applied to the first sub-pixel to the first data line; a second-first MUX switch element that is connected to the second data line to supply the second mode selection voltage to the second data line; and a second-second MUX switch element that is connected to the second data line to supply a second data voltage to be applied to the second sub-pixel to the second data line.

The display panel may further include a first-first MUX switch element that is connected to the first data line to supply the first mode selection voltage to the first data line; a first-second MUX switch element that is connected to the first data line to supply a first data voltage to be applied to the first sub-pixel to the first data line; a first-third MUX switch element that is connected to the second data line to supply a second data voltage to be applied to the second sub-pixel to the second data line; a second-first MUX switch element that is connected to the third data line to supply the second mode selection voltage to the third data line; a second-second MUX switch element that is connected to the third data line to supply a third data voltage to be applied to the third sub-pixel to the third data line; and a second-third MUX switch element that is connected to the fourth data line to supply a fourth data voltage to be applied to the fourth sub-pixel to the fourth data line.

A display device according to one embodiment of the present disclosure includes: a display panel in which a plurality of data lines, a plurality of sub-pixels connected to corresponding data line, a first mode selection circuit that applies a first mode selection voltage to one or more sub-pixels through one of the data lines to select a first viewing angle as a viewing angle of the one or more sub-pixels, and a second mode selection circuit that applies a second mode selection voltage to the one or more sub-pixels through another one of the data lines to select a second viewing angle as the viewing angle of the one or more sub-pixels are arranged; a data driver configured to supply a data voltage to the data lines; and a mode selection voltage supply configured to generate the first mode selection voltage and the second mode selection voltage.

A display device according to another embodiment of the present disclosure includes: a display panel in which a first sub-pixel connected to a first data line, a second sub-pixel connected to a second data line, a third sub-pixel connected to a third data line, a fourth sub-pixel connected to a fourth data line, a first mode selection circuit that receives a first mode selection voltage through one of the first to fourth data lines to select a first viewing angle as a viewing angle of the first to fourth sub-pixels, and a second mode selection circuit that receives a second mode selection voltage through another one of the first to fourth data lines to select a second viewing angle as the viewing angle of the first to fourth sub-pixels are arranged; a data driver configured to supply a data voltage to the data lines; and a mode selection voltage supply configured to generate the first mode selection voltage and the second mode selection voltage.

The mode selection voltage supply may be embedded in the data driver.

A display device according to another embodiment of the present disclosure includes: a plurality of sub-pixels, each of the plurality of sub-pixels including a first light-emitting element and a second light-emitting element, a driving element, a first switching element connected between the first light-emitting element and the driving element, and a second switching element connected between the second light-emitting element and the driving element; and a selection unit connected to the first switching element and the second switching element, and configured to supply one of a first selection signal to switch the first switching element or a second selection signal to switch the second switching element.

The first light-emitting element and the second light-emitting element may emit light of different angles.

The first light-emitting element may include a first lens, the second light-emitting element includes a second lens, and the first lens and the second lens are configured to concentrate light through angles different from one another.

The selection unit may include: a first model selection circuit connected to supply the first selection signal to the first switching element; and a second model selection circuit connected to supply the second selection signal to the second switching element.

The first model selection circuit and the second model selection circuit may be respectively connected to different data lines.

In the present disclosure, a mode selection voltage may be supplied to pixels through a data line to which a data voltage is applied. As a result, in the present disclosure, there is no need to add separate wires for supplying the mode selection voltage to the pixels. Additionally, in the present disclosure, since the number of wiring lines in the display panel may be reduced, the process of the display panel may be optimized and the yield may be improved.

In the present disclosure, separate wiring for supplying a mode selection voltage to pixels may be minimized, and the viewing angle may be controlled on a pixel basis.

In the present disclosure, since the viewing angle of pixels arranged in one pixel line may be varied by using a small number of mode selection circuits, the capacitor in the mode selection circuit may be increased.

The size or shape of a first pixel area driven in first mode and a second pixel area driven in second mode may be freely controlled.

The effects of the present disclosure are not limited to the above-mentioned effects, and other effects that are not mentioned will be apparently understood by those skilled in the art from the following description and the appended claims.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
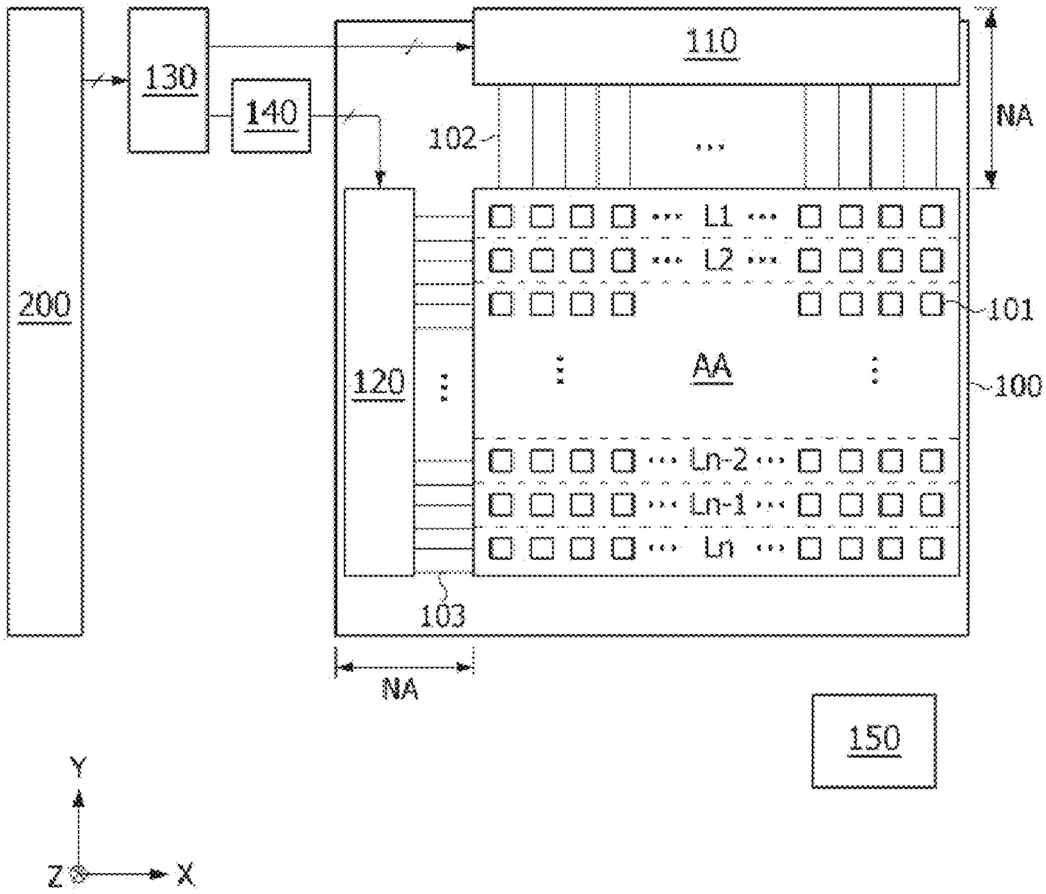
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “comprising” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after,” “following,” “next to,” “before,” or the like, it may not be continuous on a time base unless “immediately” or “directly” is used.

The terms “first,” “second,” and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device may include a plurality of transistors. The transistor may be implemented as a thin film transistor (TFT). The transistors may be implemented as an oxide thin film transistor (TFT) including an oxide semiconductor, a low temperature poly silicon TFT (LTPS TFT) including a low temperature poly silicon, and the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

With reference to FIG. 1, the display device according to an embodiment of the present disclosure includes a display panel 100, and a display panel driving circuit for writing pixel data to pixels of the display panel 100. Additionally, the display device includes a power supply 150.

The display panel 100 may be, but not limited to, a panel having a rectangular structure with a length in the X-axis direction, a width in the Y-axis direction, and a thickness in the Z-axis direction. For example, the display panel 100 may be a heterogeneous panel of which at least a portion is curved or elliptical.

The display area AA of the display panel 100 includes a pixel array to display an input image. The pixel array includes a plurality of data lines 102, a plurality of gate lines 103 crossing the data lines 102, and pixels arranged in a matrix form. The display panel 100 may further include power lines commonly connected to the pixels. The power lines may be commonly connected to pixel circuits to supply a voltage required for driving pixels 101 to the pixels 101.

Each of the pixels 101 may be divided into a red sub-pixel, a green sub-pixel, and a blue sub-pixel for color implementation. Each pixel may further include a white sub-pixel. Each sub-pixel includes a pixel circuit for driving a light emitting element. The light emitting element may include an OLED or an inorganic light emitting diode (LED). Each pixel circuit is connected to the data lines, the gate lines, and the power lines. In the following description, a pixel may be interpreted as a sub-pixel.

The pixels may be arranged as real color pixels and pentile pixels. A pentile pixel may realize a higher resolution than a real color pixel by driving two sub-pixels with different colors as one pixel 101 and using a preset pixel rendering algorithm. This pixel rendering algorithm may compensate for insufficient color representation in each pixel with the color of light emitted from adjacent pixels.

Each of the pixels may include at least one first light-emitting element that emits light in first mode, and a second light-emitting element that emits light in second mode. Each of the pixels 101 emits light from the first light-emitting element at a wide viewing angle in first mode, while emitting light from the second light-emitting element at a narrow viewing angle in second mode.

The display area AA includes a plurality of pixel lines L1 to Ln. Each of the pixel lines L1 to Ln includes one line of pixels arranged along the line direction (X-axis direction) in the pixel array of the display panel 100. Those pixels arranged in one pixel line share the gate lines 103. The sub-pixels arranged in the column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on the screen and a real object in the background is visible. The display panel 100 may be made of a flexible display panel.

The power supply 150 receives an input voltage applied from the host system 200 and outputs a voltage needed to drive the pixels 101 of the display panel 100 and the display panel driving circuit. To this end, the power supply 150 may include a direct current to direct current converter (DC-DC converter). The DC-DC converter may include a charge pump, a regulator, a buck converter, a boost converter, and the like. The power supply 150 may output a constant voltage (or direct current voltage), such as gate-on voltage, gate-off voltage, pixel driving voltage, cathode voltage, reference voltage, IC driving voltage of the display panel driving circuit, through the DC-DC converter. The gate-on voltage and the gate-off voltage may be supplied to the level shifter 140 and the gate driver 120. Voltages such as pixel driving voltage, cathode voltage, and reference voltage may be supplied to the pixels 101 through the power lines commonly connected to the pixels 101.

The power supply 150 may further include a gamma voltage generator. The gamma voltage generator receives a high-potential reference voltage and a low-potential reference voltage and outputs a plurality of gamma reference voltages divided at specific intervals on a preset gamma curve, for example, a 2.2 gamma curve. The gamma reference voltages are supplied to the data driver 110. In the data driver 110, the gamma reference voltages are subdivided by a voltage dividing circuit into grayscale voltages. The gamma voltage generator may be implemented with a programmable gamma circuit that may adjust the voltage of each of the gamma reference voltages according to digital data. The timing controller 130, the host system 200, or a separate external device may update digital data stored in a register of the programmable gamma circuit through a communication interface.

The power supply 150 may include a mode selection voltage generation circuit that outputs a mode selection voltage under the control of the timing controller 130.

The display panel driving circuit writes pixel data of the input image to the pixels 101 of the display panel 100 under the control of the timing controller 130. The display panel driving circuit includes a data driver 110 and a gate driver 120.

The display panel driving circuit may further include a touch sensor driver for driving touch sensors. The touch sensor driver is not shown in FIG. 1. The data driver 110 and the touch sensor driver may be integrated into one source drive IC.

The data driver 110 receives pixel data of the input image as a digital signal from the timing controller 130 and outputs a data voltage. The data driver 110 may receive gamma reference voltages and generate gamma compensation voltages for each grayscale through a voltage dividing circuit. The per-grayscale gamma compensation voltages are supplied to a digital to analog converter (hereinafter referred to as “DAC”) disposed in each channel of the data driver 110.

The data driver 110 samples and latches digital data received from the timing controller 130 and then inputs the digital data to the DAC. Here, the digital data includes pixel data of the input image. Additionally, the digital data may include mode selection data for selecting first mode and second mode. The DAC converts the pixel data into a gamma compensation voltage and outputs a data voltage of the pixel data. The DAC may convert the mode selection data into a gamma compensation voltage and output a mode selection voltage that has different voltage levels in first mode and second mode.

The gate driver 120 may be formed on the display panel 100 together with the circuit elements and wiring lines of the display area AA. The gate driver 120 may be disposed in at least one of left and right non-display areas NA outside the display area AA in the display panel 100 or at least a part thereof may be disposed within the display area AA.

The gate driver 120 may be disposed in the non-display areas NA on both sides of the display panel 100 with the display area AA of the display panel interposed therebetween to supply gate pulses on both sides of the gate lines 103 in a double feeding method. In another embodiment, the gate driver 120 may be disposed in at least one of the left and right non-display areas NA of the display panel 100 to supply gate signals to the gate lines 103 in a single feeding method. The gate driver 120 sequentially outputs pulses of the gate signals to the gate lines 103 under the control of the timing controller 130. The gate driver 120 may sequentially supply the gate signals to the gate lines 103 by shifting the pulses of the gate signals using shift registers. When a plurality of gate signals are applied to each pixel, the gate driver 120 may include a plurality of shift registers. The gate signal may include a scan signal being input to the pixel circuit through a plurality of gate lines, and an emission signal (or EM signal).

The mode selection voltage may be supplied to the data lines prior to the data voltage of the pixel data every frame period. The mode selection voltage may be generated at different voltage levels in first mode and second mode. In the following description, the mode selection voltage indicating first mode is referred to as first mode selection voltage, and the mode selection voltage indicating second mode is referred to as second mode selection voltage.

The timing controller 130 receives digital video data of an input image and a timing signal synchronized with this data from the host system 200. The timing signal may include a vertical synchronization signal Vsync, a horizontal synchronization signal Hsync, and a data enable signal DE. Since the vertical period and horizontal period may be known by counting the data enable signal DE, the vertical synchronization signal Vsync and the horizontal synchronization signal Hsync may be omitted. The horizontal synchronization signal Hsync and the data enable signal DE have a periodicity of 1 horizontal period (1H).

The timing controller 130 may control the display panel driving circuit by generating a data timing control signal for controlling the operation timing of the data driver 110 and a gate timing control signal for controlling the operation timing of the gate driver 120 based on the timing signals Vsync, Hsync, DE received from the host system 200. The timing controller 130 may synchronize the data driver 110 and the gate driver 120 by controlling the operation timing of the display panel driving circuit.

The gate timing control signal output from the timing controller 130 may be input to the shift register of the gate driver 120 through the level shifter 140. The level shifter 140 may convert a voltage of the gate timing control signal received from the timing controller 130 to a swing width between the gate-on voltage and the gate-off voltage and supply it to the gate driver 120.

The host system 200 may include a main board of one of a television system, a set-top box, a navigation system, a personal computer (PC), a vehicle system, a mobile terminal, and a wearable terminal. The host system 200 may scale an image signal from a video source according to the resolution of the display panel 100, and may transmit it to the timing controller 130 together with the timing signals.

The host system 200 may transmit a mode signal having different logic values in first mode and second mode together with an image signal to the timing controller 130 at least once per frame. The timing controller 130 may control the mode selection voltage output from the power supply 150 or the data driver 110 in response to the mode signal.

Figure 2:
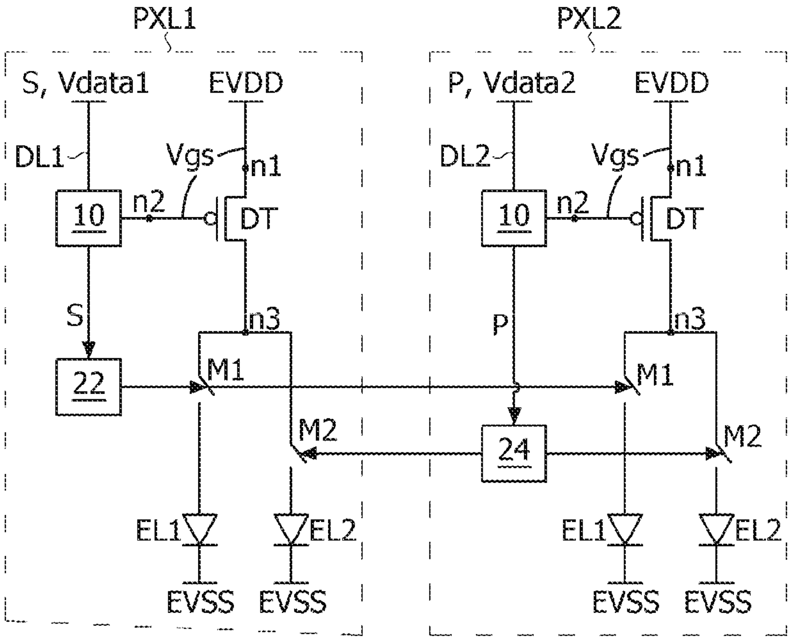
FIG. 2 is a circuit diagram illustrating a pixel circuit according to an embodiment of the present disclosure.

FIG. 2 includes a pixel circuit according to an embodiment of the present disclosure.

With reference to FIG. 2, the pixel lines of the display panel 100 include at least one first mode selection circuit 22 and at least one second mode selection circuit 24.

A plurality of sub-pixels is disposed on each of the pixel lines L1 to Ln. Each of the sub-pixels may include a plurality of transistors, a plurality of capacitors, and a plurality of light emitting elements. The pixel line may include at least first and second sub-pixels PXL1 and PXL2.

The pixel circuit of the first sub-pixel PXL1 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, a second switch element M2 connected between the driving element DT and the second light-emitting element EL2, and a first mode selection circuit 22 that receives a first mode selection voltage S to drive the first switch elements M1 of the first and second sub-pixels PXL1 and PXL2.

The pixel circuit of the second sub-pixel PXL2 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, a second switch element M2 connected between the driving element DT and the second light-emitting element EL2, and a second mode selection circuit 24 that receives a second mode selection voltage P to drive the second switch elements M2 of the first and second sub-pixels PXL1 and PXL2.

Each of the driving element DT and switch elements M1 and M2 in the pixel circuit may be implemented with a transistor.

In each sub-pixel, the driving element DT generates a current according to the gate-source voltage Vgs to drive the first and second light-emitting elements EL1 and EL2. The driving element DT includes a first electrode connected to the first node n1, a gate electrode connected to the second node n2, and a second electrode connected to the third node n3. The pixel driving voltage EVDD may be supplied to the first node n1. A switch element (not shown) may be connected between the second electrode of the driving element DT and the third node n3.

In each sub-pixel, the compensation circuit 10 includes a first capacitor connected to the gate electrode of the driving element DT. The compensation circuit 10 initializes the corresponding pixel circuit and compensates the data voltage Vdata input through the data line DL1 or DL2 by the threshold voltage Vth of the driving element DT.

The first mode selection circuit 22 includes a second capacitor that stores the first mode selection voltage S input through the first data line DL1. The first mode selection circuit 22 drives the first switch elements M1 with the first mode selection voltage S. The first mode selection circuit 22 may be connected to two or more or all of the first switch elements M1 arranged on one pixel line to turn on the connected switch elements M1 simultaneously.

The second mode selection circuit 24 includes a third capacitor that stores the second mode selection voltage P input through the second data line DL2. The second mode selection circuit 24 drives the second switch elements M2 with the second mode selection voltage P. The second mode selection circuit 24 may be connected to two or more or all of the second switch elements M2 arranged on one pixel line to turn on the connected switch elements M2 simultaneously.

Figure 3:
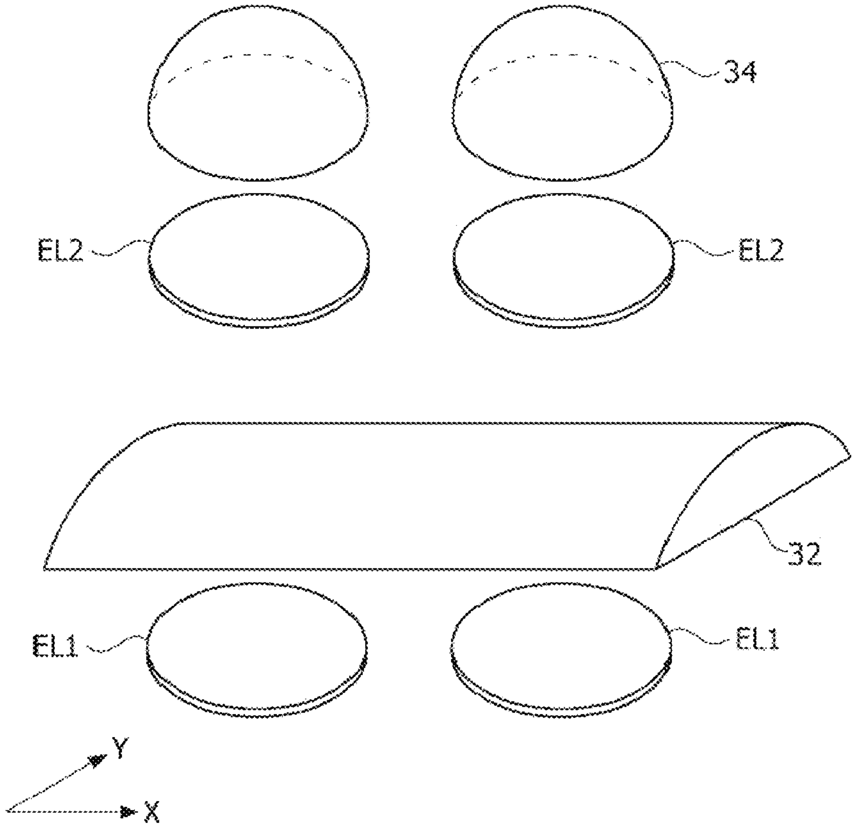
FIG. 3 is a diagram showing examples of lenses disposed on light emitting elements.

FIG. 3 is a diagram showing an example of lenses disposed on light-emitting elements.

With reference to FIG. 3, a first lens 32 may be disposed on a first light-emitting element EL1. The first lens 32 may be implemented as a semi-cylindrical lens to limit the up-down viewing angle and widen the left-right viewing angle. The first lens 32 is long in the left-right direction (or X-axis direction) of the display panel 100 and narrow in the up-down direction (Y-axis direction). A second lens 34 may be disposed on a second light-emitting element EL2.

The second lens 34 may be a hemispherical lens that is thick at the center and becomes thinner toward the edge. The second lens 34 may narrow the up-down and left-right viewing angles of the second light-emitting element EL2 by concentrating the light emitted by the second light-emitting element EL2 in second mode.

The first and second lenses 32 and 34 may be implemented with, but not limited to, a transparent medium or a transparent insulating layer pattern disposed within the display panel 100.

Figure 4:
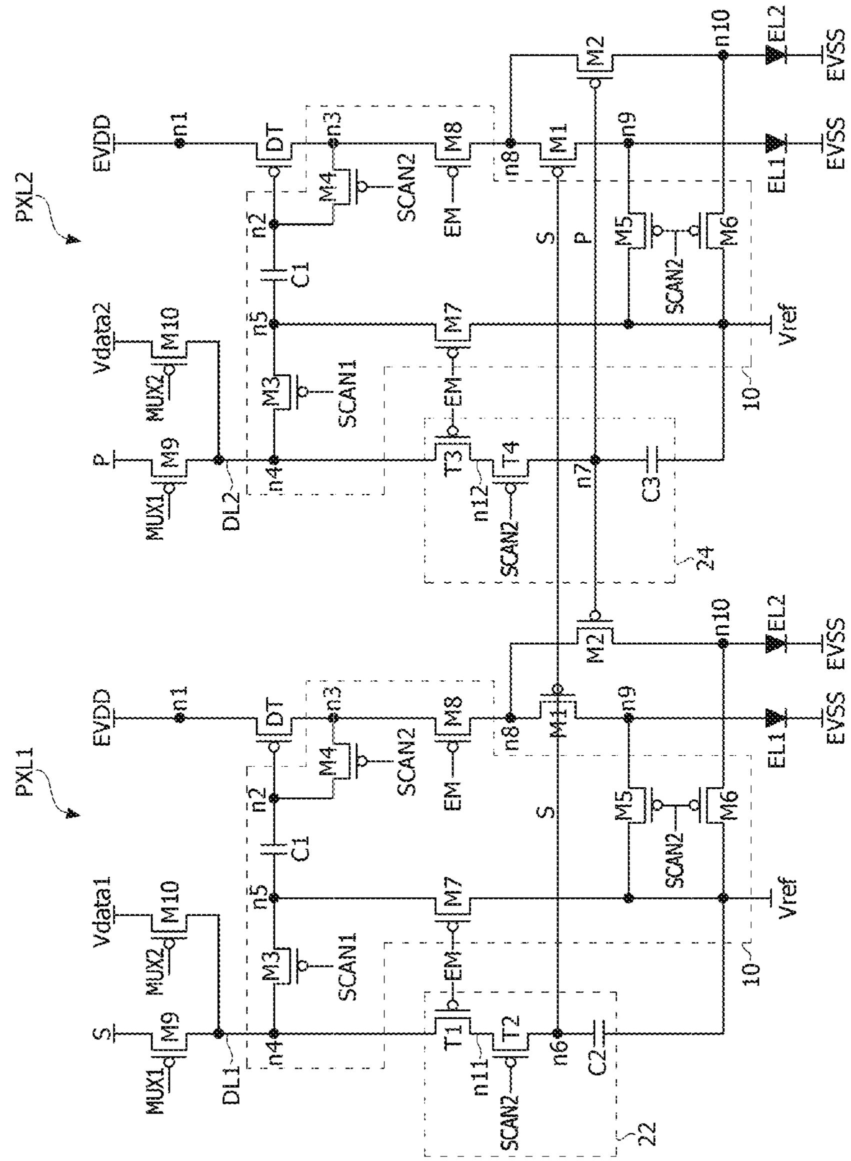
FIG. 4 is a circuit diagram illustrating one embodiment of a pixel circuit in detail.
Figure 5:
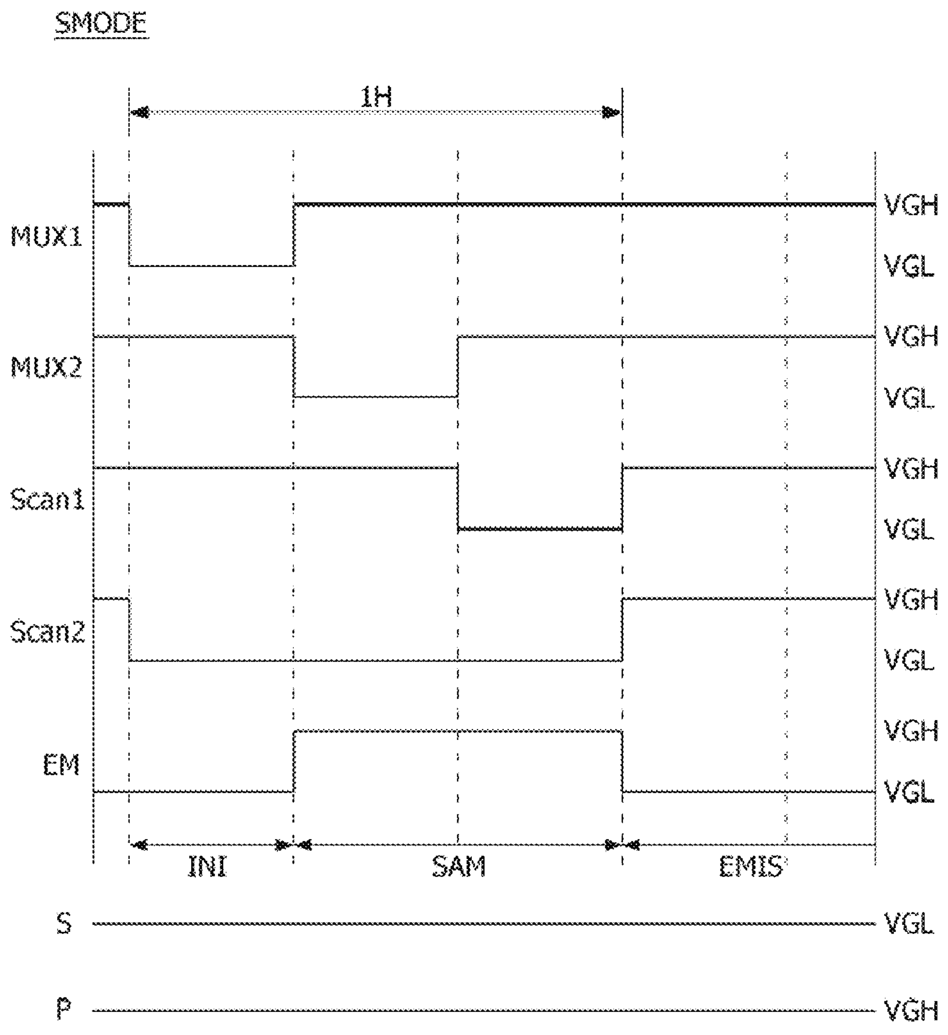
FIG. 5 is a waveform diagram showing gate signals and mode selection voltages generated in first mode.
Figure 6:
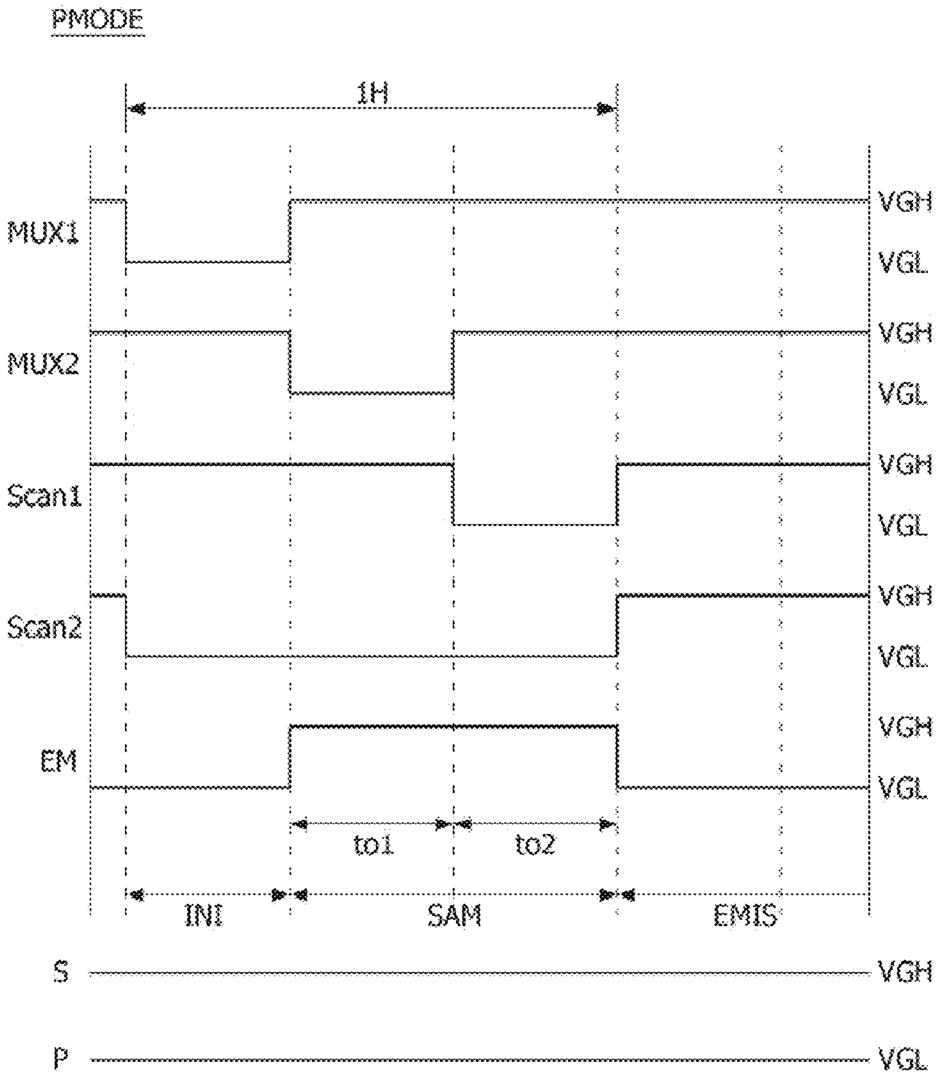
FIG. 6 is a waveform diagram showing gate signals and mode selection voltages generated in second mode.

FIG. 4 is a circuit diagram showing in detail one embodiment of the pixel circuit shown in FIG. 2. The pixel circuit shown in FIG. 4 illustrates first and second sub-pixels PXL1 and PLX2 arranged on the $N^{th}$ (N is a natural number) pixel line. FIG. 5 is a waveform diagram showing gate signals and mode selection voltages generated in first mode (SMODE). FIG. 6 is a waveform diagram showing gate signals and mode selection voltages generated in second mode (PMODE).

With reference to FIGS. 4 to 6, the pixel circuit for each of the sub-pixels PXL1 and PXL2 includes a driving element DT, a first switch element M1, a second switch element M2, a first light-emitting element EL1, a second light-emitting element EL2, and a compensation circuit 10. It should be noted that the compensation circuit 10 may include, but not limited to, a first capacitor C1 and third to eighth switch elements M3 to M8.

The display device of the present disclosure may further include a multiplexer (MUX) connected to the data lines DL1 and DL2. The multiplexer may further include two or more MUX switch elements, for example, first and second MUX switch elements M9 and M10. The first and second MUX switch elements M9 and M10 may be disposed in the non-display area NA of the display panel 100 or may be embedded in an integrated circuit (IC) where the circuits of the data driver 110 are integrated. In FIG. 4, the driving element DT and the switch elements M1 to M10 may be implemented with, but not limited to, p-channel transistors.

The pixel circuit is connected to the data lines DL1 and DL2 to which the mode selection voltages S and P and data voltage Vdata are applied, and the gate lines to which the gate signals SCAN1, SCAN2 and EM are applied. The first sub-pixel PXL1 receives the first mode selection voltage S and the data voltage Vdata of the pixel data through the first data line DL1. The second sub-pixel PXL2 receives the second mode selection voltage P and the data voltage Vdata of the pixel data through the second data line DL2.

The pixel circuit is connected to power lines such as a first power line to which the pixel driving voltage EVDD is applied, a second power line to which the cathode voltage EVSS is applied, and a third power line to which the reference voltage Vref is applied. Power lines on the display panel 100 may be commonly connected to all pixels.

The pixel driving voltage EVDD is set to a voltage that is higher than the maximum voltage of the data voltage Vdata and allows the driving element DT to operate in a saturation region. The pixel driving voltage EVDD is a higher voltage than the cathode voltage EVSS. The reference voltage Vref may be set to a voltage that is lower than the minimum voltage of the data voltage Vdata and is higher than or equal to the cathode voltage EVSS. For example, the reference voltage Vref may be set to, but not limited to, a voltage that is higher by 1 to 2 V than the cathode voltage EVSS. The gate-off voltage VGH may be set to a voltage higher than the pixel driving voltage EVDD, and the gate-on voltage VGL may be set to a voltage lower than the cathode voltage EVSS. For example, EVDD=15 [V], EVSS=3 [V], Vref=3 [V], VGH=16 [V], VGL=−9 [V], without being limited thereto. The data voltage Vdata of pixel data may have a dynamic range between 2V and 7V. As the grayscale value of the pixel data increases, the voltage level of the data voltage Vdata may be selected to be a low voltage, and the luminance of the light-emitting elements EL1 and EL2 may increase.

The mode selection voltages S and P are input to the sub-pixels PXL1 and PXL2 through the data lines DL1 and DL2. The mode selection voltages S and P may swing between a high voltage and a low voltage. In the following description, the low voltage of the mode selection voltage S or P will be described as the gate-on voltage VGL, and the high voltage thereof will be described as the gate-off voltage VGH, without being limited thereto.

The first mode selection voltage S and the second mode selection voltage P may be set as shown in Table 1 below.

TABLE 1

| | First mode | Second mode |
|---|---|---|
| S | ON (VGL) | OFF (VGH) |
| P | OFF (VGH) | ON (VGL) |

Each of the first and second mode selection voltages S and P may be varied in units of one horizontal period (1H). The first and second mode selection voltages S and P are applied to each of the sub-pixels through the data lines 102. For this reason, the first pixel area driven in first mode and the second pixel area driven in second mode may be freely specified in the X-axis direction (or gate line direction) and Y-axis direction (or data line direction) in the display panel 100. Hence, the size or shape of the first pixel area and the second pixel area within the display area AA may be freely controlled.

The gate signals SCAN1, SCAN2 and EM include a first gate signal SCAN1 input to the pixel circuit through the first gate line, a second gate signal SCAN2 input to the pixel circuit through the second gate line, and a third gate signal EM input to the pixel circuit through the third gate line. In this case, the gate driver 120 may include, but not limited to, a first shift register that sequentially supplies pulses of the first gate signal SCAN1 to the first gate lines, a second shift register that sequentially supplies pulses of the second gate signal SCAN2 to the second gate lines, and a third shift register that sequentially supplies pulses of the third gate signal EM to the third gate lines.

Pulses of the gate signals SCAN1, SCAN2 and EM swing between the gate-on voltage VGL and the gate-off voltage VGH. The switch elements M1 to M10 and T1 to T4 are turned on according to the gate-on voltage VGL applied to the gate electrodes, while they are turned off according to the gate-off voltage VGH.

Each of the first and second light-emitting elements EL1 and EL2 may be implemented with an OLED or inorganic LED. When the light-emitting elements EL1 and EL2 are implemented with an OLED, each of the light-emitting elements EL1 and EL2 includes an anode electrode, a cathode electrode, and an organic compound layer formed between these electrodes. The organic compound layer may include, but not limited to, a hole injection layer (HIL), a hole transport layer (HTL), a light emission layer (EML), an electron transport layer (ETL), and an electron injection layer (EIL). OLEDs may be implemented in a tandem structure in which multiple light emission layers are stacked. OLEDs with a tandem structure may improve the luminance and lifespan of sub-pixels.

The anode electrode of the first light-emitting element EL1 is connected to the ninth node n9, and the cathode electrode thereof is connected to the second power line to which the cathode voltage EVSS is applied. The anode electrode of the second light-emitting element EL2 is connected to the tenth node n10, and the cathode electrode thereof is connected to the second power line.

The driving element DT generates a current according to the gate-source voltage Vgs to drive the first and second light-emitting elements EL1 and EL2. The driving element DT includes a first electrode connected to the first node n1 to which the pixel driving voltage EVDD is applied, a gate electrode connected to the second node n2, and a second electrode connected to the third node n3. The first capacitor C1 is connected between the second node n2 and the fifth node n5.

The first switch element M1 is connected between the eighth node n8 and the ninth node n9. The first switch element M1 is turned on according to the gate-on voltage VGL of the first mode selection voltage S to connect the eighth node n8 to the ninth node n9. The first switch element M1 includes a first electrode connected to the eighth node n8, a gate electrode connected to the sixth node n6 to which the first mode selection voltage S is applied, and a second electrode connected to the ninth node n9.

The second switch element M2 is connected between the eighth node n8 and the tenth node n10. The second switch element M2 is turned on according to the gate-on voltage VGL of the second mode selection voltage P to connect the eighth node n8 to the tenth node n10. The second switch element M2 includes a first electrode connected to the eighth node n8, a gate electrode connected to the seventh node n7 to which the second mode selection voltage P is applied, and a second electrode connected to the tenth node n10.

The third switch element M3 is connected between the fourth node n4 and the fifth node n5. The third switch element M3 is turned on according to the gate-on voltage VGL of the first gate signal SCAN1 to apply the data voltage Vdata of the pixel data to the first capacitor Cst. The third switch element M3 includes a first electrode connected to the fourth node n4, a gate electrode connected to the first gate line to which the first gate signal SCAN1 is applied, and a second electrode connected to the fifth node n5.

The fourth switch element M4 is connected between the second node n2 and the third node n3. The fourth switch element M4 is turned on according to the gate-on voltage VGL of the second gate signal SCAN2 to connect the gate electrode and the second electrode of the driving element DT. The fourth switch element M4 includes a first electrode connected to the second node n2, a gate electrode connected to the second gate line to which the second gate signal SCAN2 is applied, and a second electrode connected to the third node n3.

The fifth switch element M5 is connected between the third power line and the ninth node n9. The fifth switch element M5 is turned on according to the gate-on voltage VGL of the second gate signal SCAN2 to connect the third power line to which the reference voltage Vref is applied to the ninth node n9. The fifth switch element M5 includes a first electrode connected to the third power line, a gate electrode connected to the second gate line to which the second gate signal SCAN2 is applied, and a second electrode connected to the ninth node n9.

The sixth switch element M6 is connected between the third power line and the tenth node n10. The sixth switch element M6 is turned on according to the gate-on voltage VGL of the second gate signal SCAN2 to connect the third power line to which the reference voltage Vref is applied to the tenth node n10. The sixth switch element M6 includes a first electrode connected to the third power line, a gate electrode connected to the second gate line to which the second gate signal SCAN2 is applied, and a second electrode connected to the tenth node n10.

The seventh switch element M7 is connected between the fifth node n5 and the third power line. The seventh switch element M7 is turned on according to the gate-on voltage VGL of the third gate signal EM to connect the fifth node n5 to the third power line. The seventh switch element M7 includes a first electrode connected to the fifth node n5, a gate electrode connected to the third gate line to which the third gate signal EM is applied, and a second electrode connected to the third power line.

The eighth switch element M8 is connected between the third node n3 and the eighth node n8. The eighth switch element M8 is turned on according to the gate-on voltage VGL of the third gate signal EM to connect the third node n3 to the eighth node n8. The eighth switch element M8 includes a first electrode connected to the third node n3, a gate electrode connected to the third gate line, and a second electrode connected to the eighth node n8.

The fourth node n4 of the first sub-pixel PXL1 is connected to the first data line DL1. When the first MUX switch element M9 connected to the first sub-pixel PXL1 is turned on, the first mode selection voltage S is applied to the first data line DL1. The first data voltage Vdata1 to be charged in the first capacitor C1 of the first sub-pixel PXL1 is applied to the first data line DL1 when the second MUX switch element M10 connected to the first channel of the data driver 110 is turned on.

The first MUX switch element M9 connected to the first sub-pixel PXL1 includes a first electrode to which the first mode selection voltage S is applied, a gate electrode to which the first MUX signal MUX1 is applied, and a second electrode connected to the first data line DL1. The first MUX switch element M9 is turned on in response to the gate-on voltage VGL of the first MUX signal MUX1.

The second MUX switch element M10 connected to the first sub-pixel PXL1 includes a first electrode to which the first data voltage Vdata1 is applied, a gate electrode to which the second MUX signal MUX2 is applied, and a second electrode connected to the first data line DL1. The second MUX switch element M10 is turned on in response to the gate-on voltage VGL of the second MUX signal MUX2.

The fourth node n4 of the second sub-pixel PXL2 is connected to the second data line DL2. When the first MUX switch element M9 connected to the second sub-pixel PXL2 is turned on, the second mode selection voltage P is applied to the second data line DL2. The second data voltage Vdata2 to be charged in the first capacitor C1 of the second sub-pixel PXL2 is applied to the second data line DL2 when the second MUX switch element M10 connected to the second sub-pixel PXL2 is turned on.

The first MUX switch element M9 connected to the second sub-pixel PXL2 includes a first electrode to which the second mode selection voltage P is applied, a gate electrode to which the first MUX signal MUX1 is applied, and a second electrode connected to the second data line DL2. The first MUX switch element M9 is turned on in response to the gate-on voltage VGL of the first MUX signal MUX1.

The second MUX switch element M10 connected to the second sub-pixel PXL2 includes a first electrode to which the second data voltage Vdata2 is applied from the data driver 110, a gate electrode to which the second MUX signal MUX2 is applied, and a second electrode connected to the second data line DL2. The second MUX switch element M10 is turned on in response to the gate-on voltage VGL of the second MUX signal MUX2.

The timing controller 130 may generate MUX signals MUX1 and MUX2 to control the operation timing of the MUX switch elements M9 and M10. The voltage levels of the MUX signals MUX1 and MUX2 output from the timing controller 130 may be converted through the level shifter 140 and supplied to the gate electrodes of the MUX switch elements M9 and M10. When the voltage level of the MUX signals MUX1 and MUX2 output from the timing controller 130 is a low voltage (0V), the level shifter 140 may output the MUX signals MUX1 and MUX2 as the gate-on voltage VGL. When the voltage level of the MUX signals MUX1 and MUX2 output from the timing controller 130 is a high voltage (3.3V), the level shifter 140 may output the MUX signals MUX1 and MUX2 as the gate-off voltage VGH.

The first mode selection circuit 22 may be connected to the fourth node n4 and the sixth node n6 of the first sub-pixel PXL1, and the third power line to which the reference voltage Vref is applied. The first mode selection circuit 22 may include a first mode switch element T1, a second mode switch element T2, and a second capacitor C2. The first mode switch element T1 and the second mode switch element T2 are connected in series between the fourth node n4 and the sixth node n6.

The first mode switch element T1 is connected between the fourth node n4 and the second mode switch element T2 of the first sub-pixel PXL1. The first mode switch element T1 is turned on according to the gate-on voltage VGL of the third gate signal EM to connect the fourth node n4 to the first electrode of the second mode switch element T2. The first mode switch element T1 includes a first electrode connected to the fourth node n4, a gate electrode connected to the third gate line to which the third gate signal EM is applied, and a second electrode connected to the eleventh node n11.

The second mode switch element T2 is connected between the first mode switch element T1 and the second capacitor C2. The second mode switch element T2 is turned on according to the gate-on voltage VGL of the second gate signal SCAN2 to connect the eleventh node n11 to the second capacitor C2. The second mode switch element T2 includes a first electrode connected to the eleventh node n11, a gate electrode connected to the second gate line to which the second gate signal SCAN2 is applied, and a second electrode connected to the sixth node n6.

The second capacitor C2 is connected between the sixth node n6 and the third power line, and stores the first mode selection voltage S when the first and second mode switch elements T1 and T2 are turned on. The first electrode of the second capacitor C2 is connected to the sixth node n6. The second electrode of the second capacitor C2 is connected to the third power line to which the reference voltage Vref is applied. The capacity of the second capacitor C2 may be greater than or equal to that of the first capacitor C1.

The second mode selection circuit 24 may be connected to the fourth node n4 and the seventh node n7 of the second sub-pixel PXL2, and the third power line to which the reference voltage Vref is applied. The second mode selection circuit 24 may include a third mode switch element T3, a fourth mode switch element T4, and a third capacitor C3. The third mode switch element T3 and the fourth mode switch element T4 are connected in series between the fourth node n4 and the seventh node n7.

The third mode switch element T3 is connected between the fourth node n4 and the fourth mode switch element T4 of the second sub-pixel PXL2. The third mode switch element T3 is turned on according to the gate-on voltage VGL of the third gate signal EM to connect the fourth node n4 to the first electrode of the fourth mode switch element T4. The third mode switch element T3 includes a first electrode connected to the fourth node n4, a gate electrode connected to the third gate line to which the third gate signal EM is applied, and a second electrode connected to the twelfth node n12.

The fourth mode switch element T4 is connected between the third mode switch element T3 and the third capacitor C3. The fourth mode switch element T4 is turned on according to the gate-on voltage VGL of the second gate signal SCAN2 to connect the twelfth node n12 to the third capacitor C3. The fourth mode switch element T4 includes a first electrode connected to the twelfth node n12, a gate electrode connected to the second gate line to which the second gate signal SCAN2 is applied, and a second electrode connected to the seventh node n7.

The third capacitor C3 is connected between the seventh node n7 and the third power line, and stores the second mode selection voltage P when the third and fourth mode switch elements T3 and T4 are turned on. The first electrode of the third capacitor C3 is connected to the seventh node n7. The second electrode of the third capacitor C3 is connected to the third power line to which the reference voltage Vref is applied. The capacity of the third capacitor C3 may be greater than or equal to that of the first capacitor C1 and may be equal to that of the second capacitor C2.

One frame period of the pixel circuit may be divided into an initialization period INI, a sampling period SAM, and an emission period EMIS as shown in FIGS. 5 and 6.

With reference to FIGS. 5 and 6, the voltage of the first MUX signal MUX1 may have a gate-on voltage VGL during the first period, a gate-off voltage VGH during the second-first period set after the first period, a gate-off voltage VGH during the second-second period set after the second-first period, and a gate-off voltage VGH during the third period set after the second-second period. The voltage of the second MUX signal MUX2 may have a gate-off voltage VGH during the first period, a gate-on voltage VGL during the second-first period, a gate-off voltage VGH during the second-second period, and a gate-off voltage VGH during the third period. The first gate signal SCAN1 may have a gate-off voltage VGH during the first and second-first periods, a gate-on voltage VGL during the second-second period, and a gate-off voltage VGH during the third period. The second gate signal SCAN2 may have a gate-on voltage VGL during the first to second-second periods, and a gate-off voltage VGH during the third period. The third gate signal EM may have a gate-on voltage VGL during the first period, a gate-off voltage VGH during the second-first and second-second periods, and a gate-on voltage VGL during the third period. Here, the first period may be the initialization period. The second-first and second-second periods may be the sampling period. The third period may be the emission period.

In FIGS. 5 and 6, '1H' indicates one horizontal period. The sampling period SAM may be divided into a first sampling period t01 and a second sampling period t02. The initialization period INI, the sampling period SAM, and the emission period EMIS may be controlled by the waveforms of the gate signals SCAN1, SCAN2 and EM. The gate signals SCAN1, SCAN2 and EM may be generated at the same timing in first and second modes. The MUX signals MUX1 and MUX2 may be generated at the same timing in first and second modes.

Figure 7A:
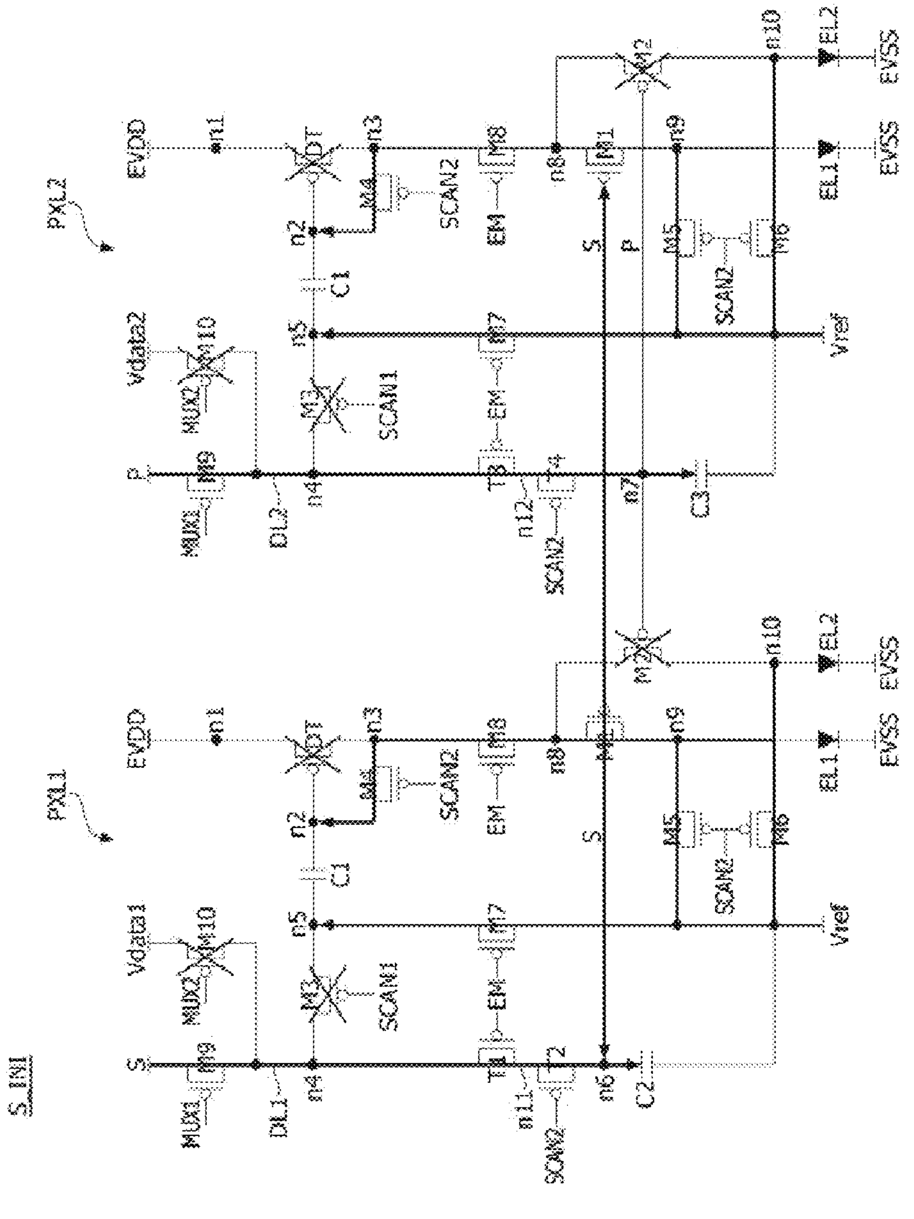
FIGS. 7A to 10B are circuit diagrams illustrating step-by-step operations of the pixel circuit when the signals shown in FIGS. 5 and 6 are applied to the pixel circuit shown in FIG. 4.
Figure 8A:
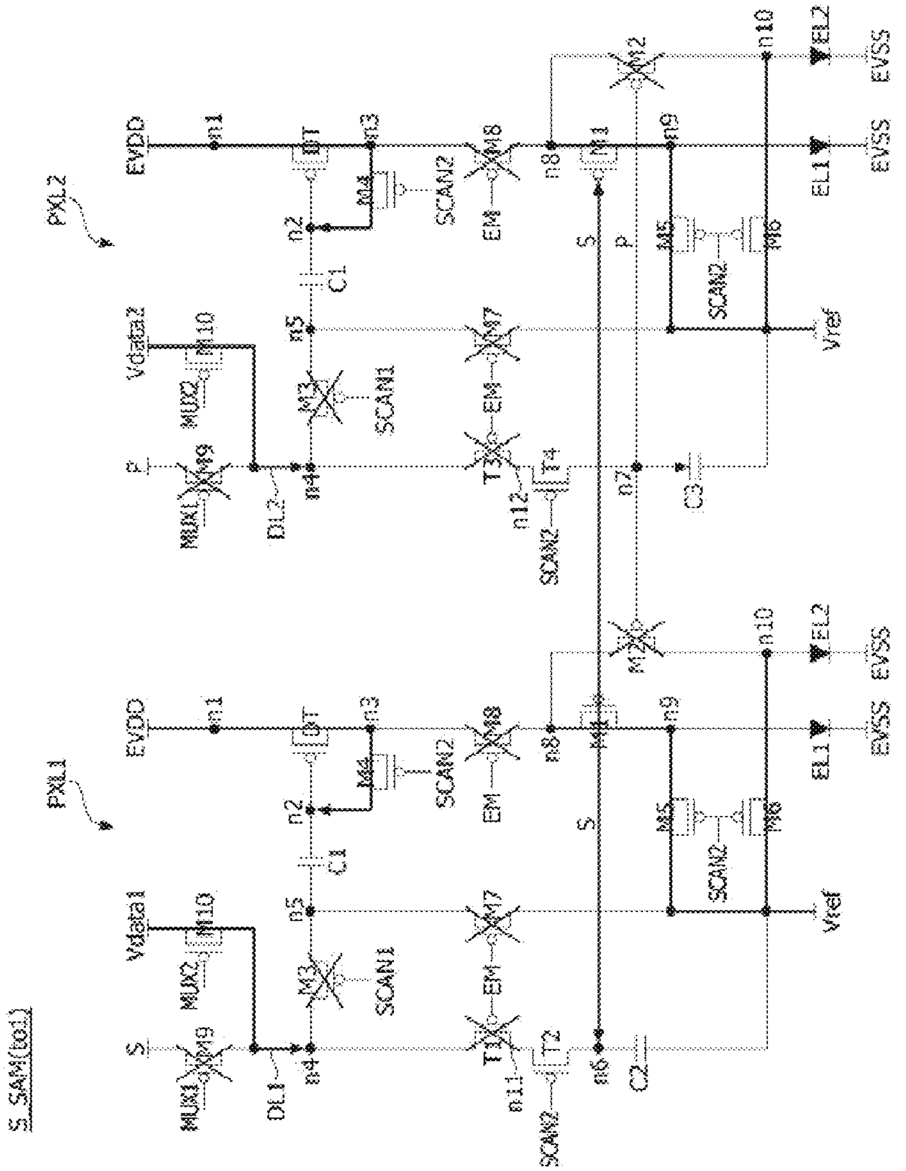
Figure 8B:
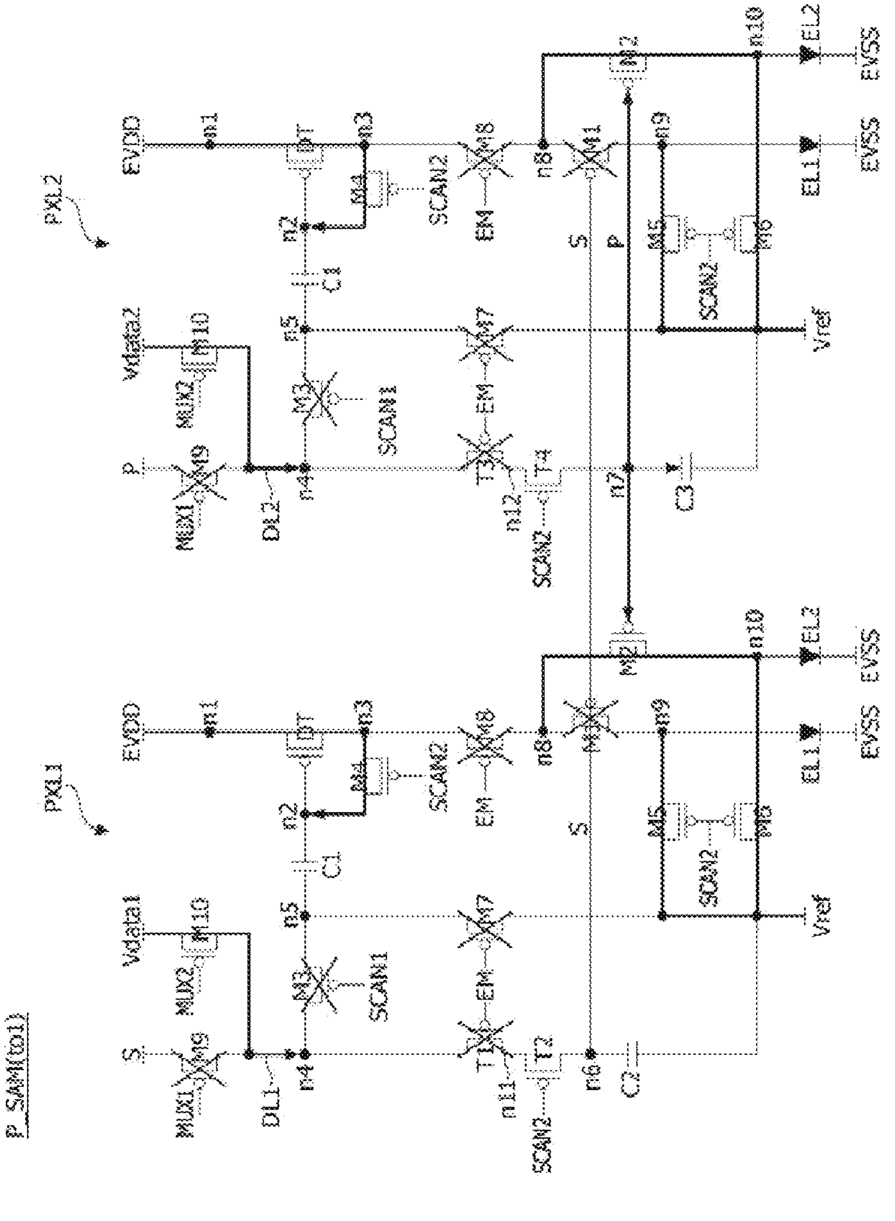
Figure 9A:
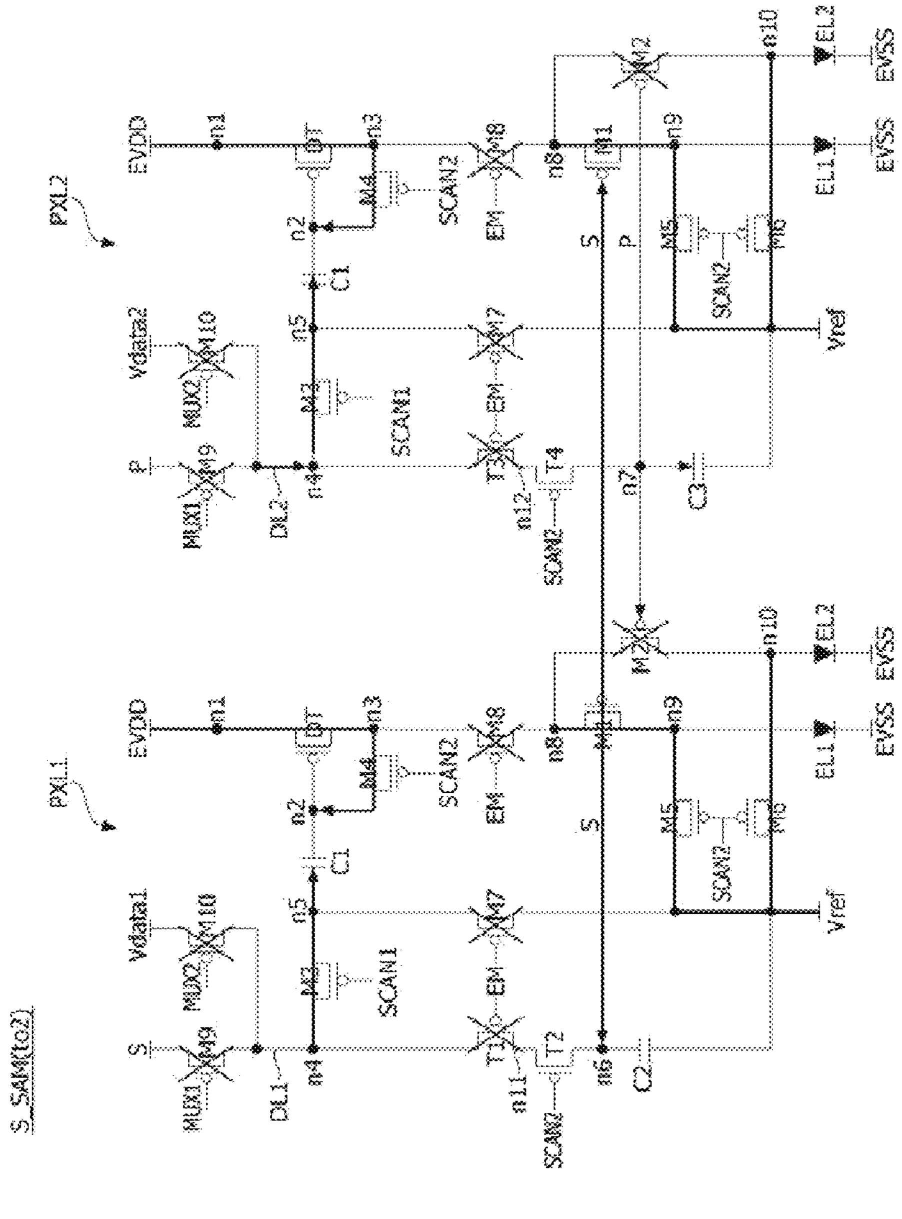
Figure 9B:
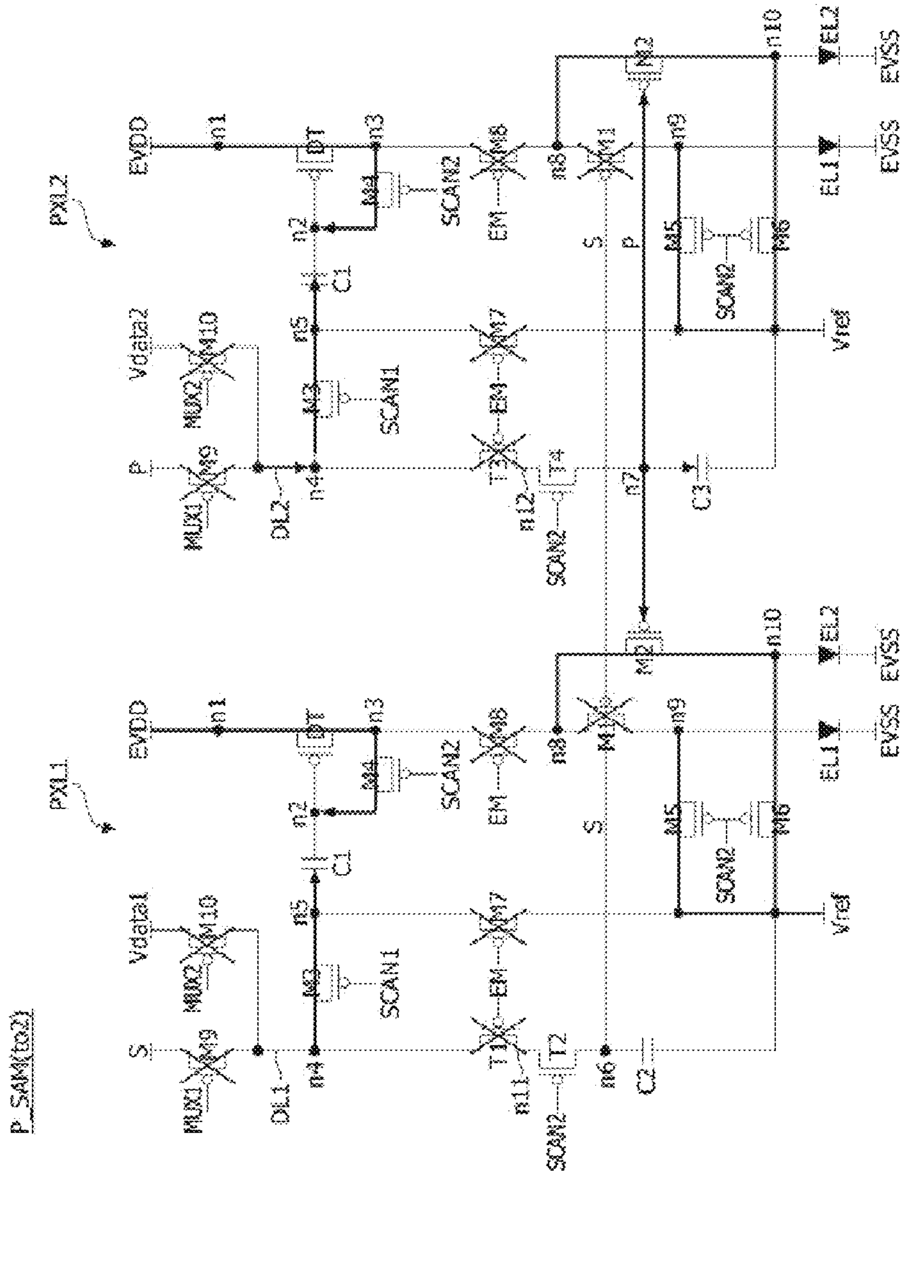
Figure 10A:
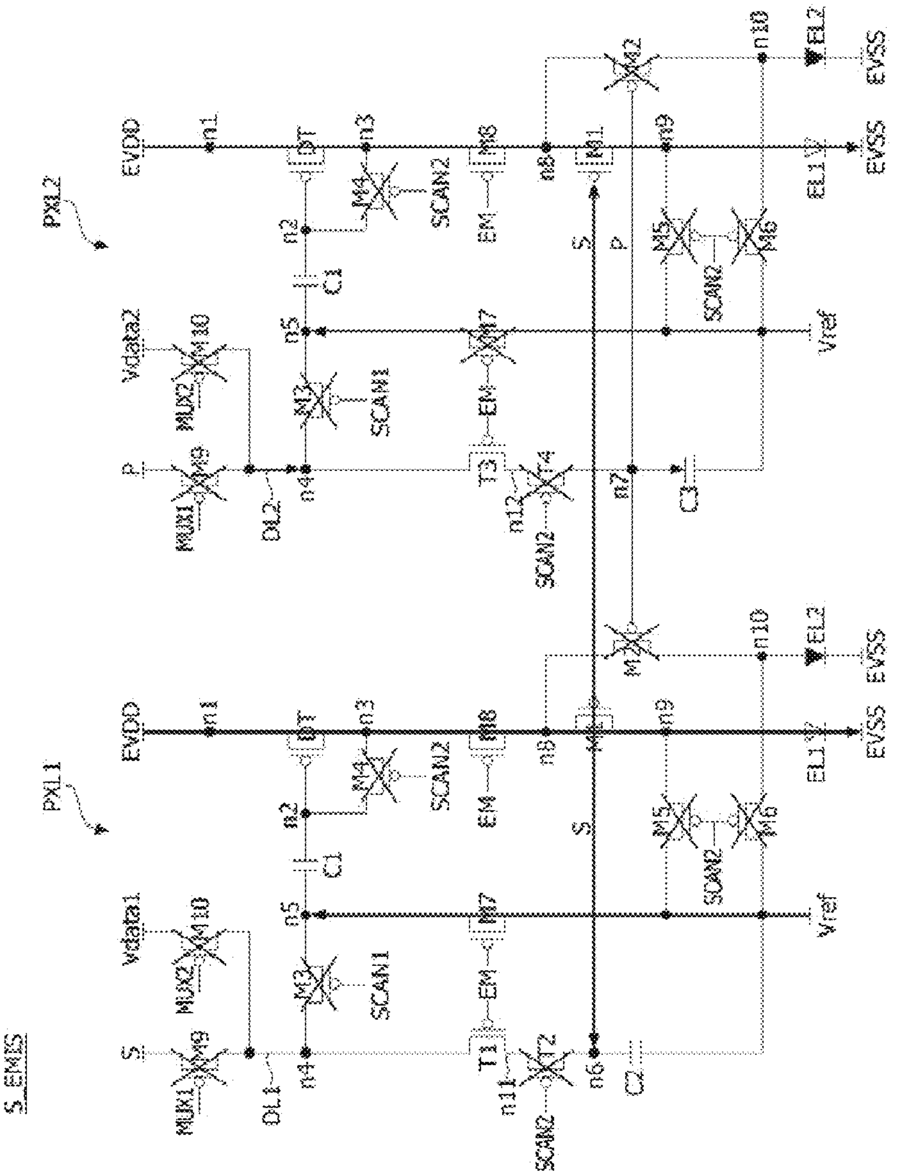
Figure 10B:
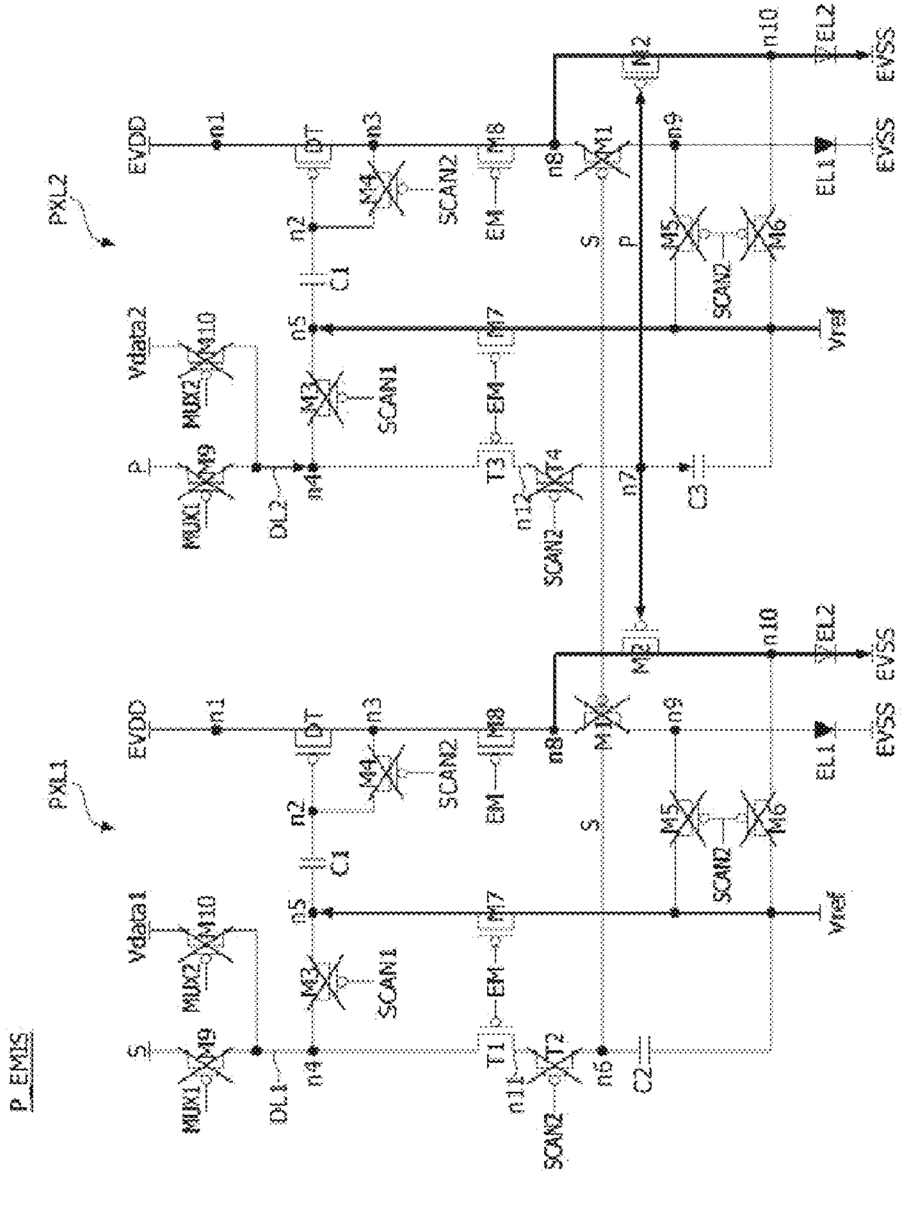

FIGS. 7A to 10B are circuit diagrams showing step-by-step operations of the pixel circuit when the signals shown in FIGS. 5 and 6 are applied to the pixel circuit shown in FIG. 4. FIG. 7A illustrates the operation of the pixel circuit during the first mode initialization period S_INI. FIG. 7B illustrates the operation of the pixel circuit during the second mode initialization period P_INI. FIG. 8A illustrates the operation of the pixel circuit during the first mode first sampling period S_SAM (t01). FIG. 8B illustrates the operation of the pixel circuit during the second mode first sampling period P_SAM (t01). FIG. 9A illustrates the operation of the pixel circuit during the first mode second sampling period S_SAM (t02). FIG. 9B illustrates the operation of the pixel circuit during the second mode second sampling period P_SAM (t02). FIG. 10A illustrates the operation of the pixel circuit during the first mode emission period S_EMIS. FIG. 10B illustrates the operation of the pixel circuit during the second mode emission period P_EMIS.

With reference to FIGS. 5 to 10B, during the initialization period S_INI in first mode, the voltages of the first MUX signal MUX1, second gate signal SCAN2, and third gate signal EM have a gate-on voltage VGL, and the voltages of the second MUX signal MUX2 and first gate signal SCAN1 have a gate-off voltage VGH. In first mode, as shown in Table 1 and FIG. 5, the first mode selection voltage S has a gate-on voltage VGL, while the second mode selection voltage P has a gate-off voltage VGH. Hence, during the initialization period S_INI in first mode, as shown in FIG. 7A, the first switch element M1, the fourth to eighth switch elements M4 to M8, the first MUX switch element M9, and the mode switch elements T1 to T4 are turned on, while the second switch element M2, the third switch element M3, and the second MUX switch element M10 are turned off.

In the initialization period S_INI in first mode, the gate-on voltage VGL of the first mode selection voltage S is charged in the second capacitor C2, and the gate-off voltage VGH of the second mode selection voltage P is charged in the third capacitor C3. In the initialization period S_INI in first mode, the voltages of the second, fifth, ninth, and tenth nodes n2, n5, n9 and n10 are initialized to the reference voltage Vref. The voltage of the sixth node n6 maintains the gate-on voltage VGL for one frame period due to the voltage of the second capacitor C2 charged during the initialization period S_INI in first mode. The voltage of the seventh node n7 maintains the gate-off voltage VGH for one frame period due to the voltage of the third capacitor C3 charged during the initialization period S_INI in first mode. Therefore, as shown in FIGS. 7A, 8A, 9A and 10A, in the sub-pixels PXL1 and PXL2 driven in first mode for one frame period, the first switch elements M1 are in an on state, and the second switch elements M2 are in an off state.

Figure 7B:
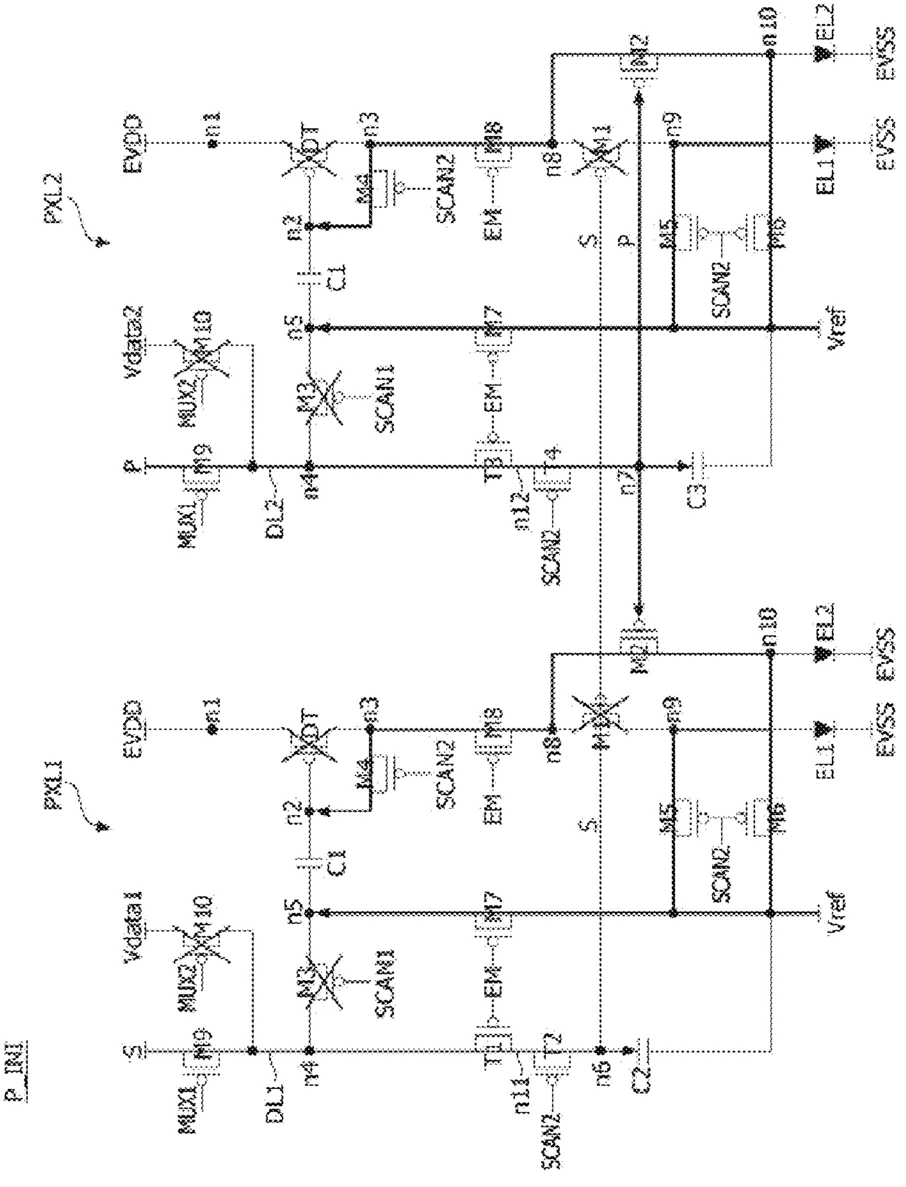

During the initialization period P_INI in second mode, the voltages of the first MUX signal MUX1, second gate signal SCAN2, and third gate signal EM are a gate-on voltage VGL, and the voltages of the second MUX signal MUX2 and first gate signal SCAN1 are a gate-off voltage VGH. In the second mode, as shown in Table 1 and FIG. 6, the first mode selection voltage S is a gate-off voltage VGH, while the second mode selection voltage P is a gate-on voltage VGL. Hence, during the initialization period P_INI in second mode, as shown in FIG. 7B, the second switch element M2, fourth to eighth switch elements M4 to M8, first MUX switch element M9, and mode switch elements T1 to T4 are turned on, while the first switch element M1, third switch element M3, and second MUX switch element M10 are turned off.

In the initialization period P_INI in second mode, the gate-off voltage VGH of the first mode selection voltage S is charged in the second capacitor C2, and the gate-on voltage VGL of the second mode selection voltage P is charged in the third capacitor C3. In the initialization period P_INI in second mode, the voltages of the second, fifth, ninth, and tenth nodes n2, n5, n9 and n10 are initialized to the reference voltage Vref. The voltage of the sixth node n6 maintains the gate-off voltage VGL for one frame period due to the voltage of the second capacitor C2 charged during the initialization period P_INI in second mode. The voltage of the seventh node n7 maintains the gate-on voltage VGL for one frame period due to the voltage of the third capacitor C3 charged during the initialization period P_INI in second mode. Hence, as shown in FIGS. 7B, 8B, 9B and 10B, in the sub-pixels PXL1 and PXL2 driven in second mode for one frame period, the first switch elements M1 are in an off state, and the second switch elements M2 are in an on state.

During the first sampling period t01, as shown in FIGS. 5 and 6, the voltages of the second MUX signal MUX2 and second gate signal SCAN2 are a gate-on voltage VGL. During the first sampling period t01, the voltages of the first MUX signal MUX1, first gate signal SCAN1, and third gate signal EM are a gate-off voltage VGH. Hence, during the first sampling period t01, as shown in FIGS. 8A and 8B, the fourth to sixth switch elements M4, M5 and M6, second MUX switch element M10, and second mode switch element T2, and fourth mode switch element T4 are turned on. During the first sampling period t01, the third switch element M3, seventh switch element M7, eighth switch element M8, first MUX switch element M9, first mode switch element T1, and third mode switch element T3 are turned off.

During the second sampling period t02, as shown in FIGS. 5 and 6, the voltages of the first and second gate signals SCAN1 and SCAN2 are a gate-on voltage VGL. During the second sampling period t02, the voltages of the MUX signals MUX1 and MUX2 and third gate signal EM are a gate-off voltage VGH. Hence, during the second sampling period t02, as shown in FIGS. 9A and 9B, the third to sixth switch elements M3, M4, M5 and M6, second mode switch element T2, and fourth mode switch element T4 are turned on. During the second sampling period t02, the seventh switch element M7, eighth switch element M8, first MUX switch element M9, second MUX switch element M10, first mode switch element T1, and third mode switch element T3 are turned off.

During the sampling period SAM, the data voltages Vdata1 and Vdata2 of the pixel data are charged to the data lines DL1 and DL2 through the second MUX switch element M10, and the second node n2 is charged with the pixel driving voltage EVDD through the driving element DT. A parasitic capacitance may be connected to the data lines DL1 and DL2, so that the data voltages Vdata1 and Vdata2 may be charged to the data lines DL1 and DL2. In the first sampling period t01, the driving element DT is turned on. During the sampling period SAM, when the gate voltage of the driving element DT rises and the gate-source voltage Vgs of the driving element DT reaches the threshold voltage Vth, the driving element DT is turned off. When the sampling period SAM ends, the voltages of the data lines DL1 and DL2 are the data voltages Vdata1 and Vdata2 of the pixel data, and the voltage of the second node n2 is EVDD+Vth. Here, 'Vth' is the threshold voltage of the driving element DT.

When the sampling period SAM ends, the voltage of the fifth node n5 is the data voltage Vdata1 or Vdata2, and the voltage of the second node n2 is EVDD+Vth. Hence, when the sampling period SAM ends, the voltage of the first capacitor C1 is Vdata-(EVDD+Vth). Here, Vdata is either Vdata1 or Vdata2.

When the first and second sub-pixels PXL1 and PXL2 operate in first mode, during the sampling period SAM, as shown in FIGS. 8A and 9A, the first switch elements M1 maintain an on state due to the gate-on voltage VGL charged in the second capacitor C2, while the second switch elements M2 maintain an off state due to the gate-off voltage VGH charged in the third capacitor C3.

When the first and second sub-pixels PXL1 and PXL2 operate in second mode, during the sampling period SAM, as shown in FIGS. 8B and 9B, the second switch elements M2 maintain an on state due to the gate-on voltage VGL charged in the third capacitor C3, while the first switch elements M1 maintain an off state due to the gate-off voltage VGH charged in the second capacitor C2.

During the emission period EMIS, the voltage of the third gate signal EM is a gate-on voltage VGL, and the voltages of the first and second gate signals SCAN1 and SCAN2 and MUX signals MUX1 and MUX2 are a gate-off voltage VGH. Hence, during the emission period EMIS, as shown in FIGS. 10A and 10B, the seventh switch element M7, eighth switch element M8, first mode switch element T1, and third mode switch element T3 are turned on. During the emission period EMIS, the third to sixth switch elements M3, M4, M5 and M6, MUX switch elements M9 and M10, second mode switch element T2, and fourth mode switch element T4 are turned off.

When the first and second sub-pixels PXL1 and PXL2 operate in first mode, since the first switch elements M1 maintain an on state during the emission period EMIS, a current flows between the pixel driving voltage EVDD and the cathode voltage EVSS, so that the first light-emitting element EL1 may emit light. At this time, since the second switch element M2 is in an off state, the second light-emitting element EL2 does not emit light.

During the emission period S_EMIS in first mode, the voltage of the fifth node n5 is the reference voltage Vref, and the voltage of the second node n2 is Vref-Vdata+EVDD+Vth. During the emission period S_EMIS in first mode, the driving element DT supplies a current generated according to the gate-source voltage Vgs to the first light-emitting element EL1. During the first mode emission period S_EMIS, the first light-emitting element EL1 emits light with a brightness corresponding to the grayscale value of the pixel data, and the light is emitted at a wide viewing angle through the first lens 32.

When the first and second sub-pixels PXL1 and PXL2 operate in second mode, since the second switch elements M2 maintain an on state during the emission period EMIS, a current flows between the pixel driving voltage EVDD and the cathode voltage EVSS, so that the second light-emitting element EL2 may emit light. At this time, since the first switch element M1 is in an off state, the first light-emitting element EL1 does not emit light.

During the emission period P_EMIS in second mode, the voltage of the fifth node n5 is the reference voltage Vref, and the voltage of the second node n2 is Vref-Vdata+EVDD+Vth. During the emission period P_EMIS in second mode, the driving element DT supplies a current generated according to the gate-source voltage Vgs to the second light-emitting element EL2. During the second mode emission period P_EMIS, the second light-emitting element EL2 emits light with a brightness corresponding to the grayscale value of the pixel data, and the light is emitted at a narrow viewing angle through the second lens 34.

Figure 11:
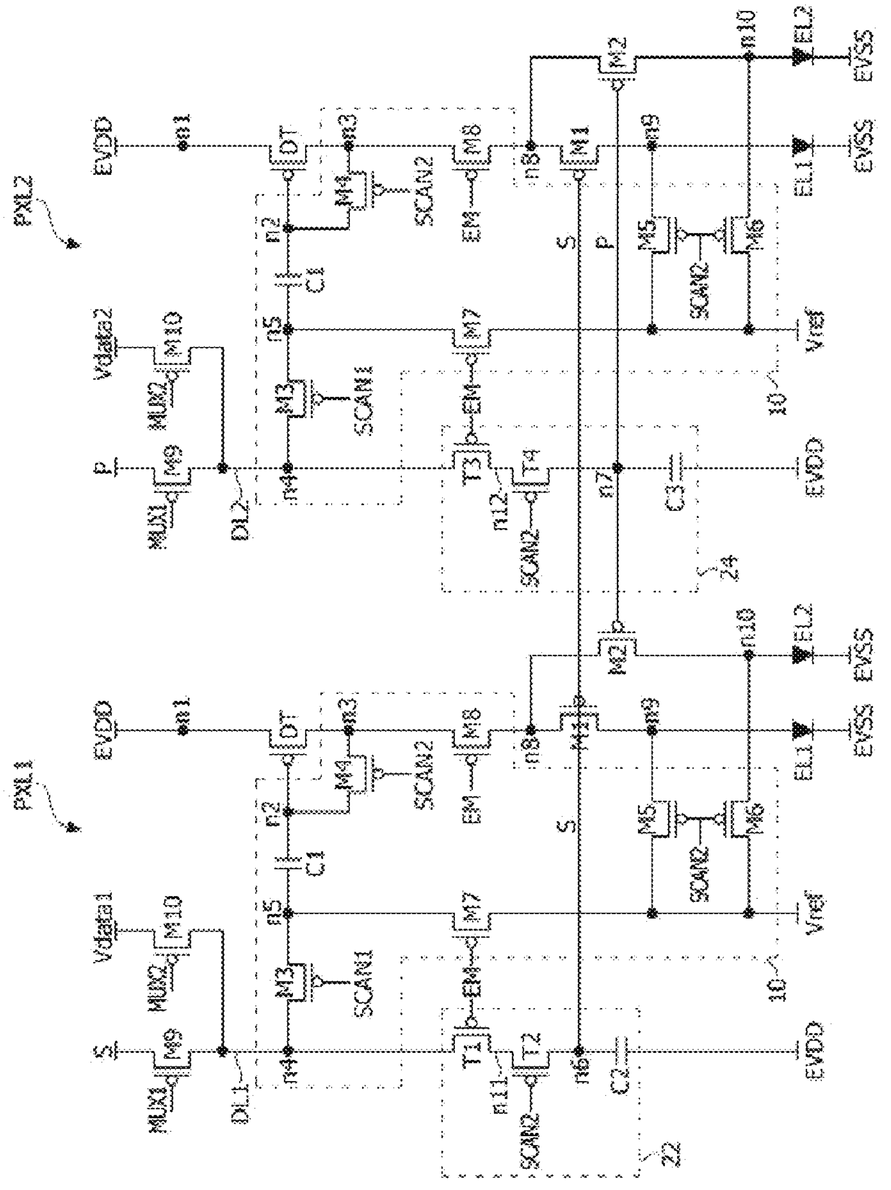
FIG. 11 is a circuit diagram illustrating another embodiment of a pixel circuit in detail.

FIG. 11 is a circuit diagram showing in detail another embodiment of the pixel circuit. In the pixel circuit shown in FIG. 11, elements that are substantially the same as those in the pixel circuit shown in FIG. 4 will be given the same reference symbols, and a detailed description thereof will be omitted. One frame period of the pixel circuit shown in FIG. 11 is divided into an initialization period INI, a sampling period SAM, and an emission period EMIS as shown in FIGS. 5 and 6. When the signals shown in FIG. 5 are applied to the pixel circuit shown in FIG. 11, the pixel circuit operates in first mode. When the signals shown in FIG. 6 are applied to the pixel circuit shown in FIG. 11, the pixel circuit operates in second mode.

With reference to FIG. 11, the pixel circuit of each of the sub-pixels PXL1 and PXL2 includes a driving element DT, a first switch element M1, a second switch element M2, a first light-emitting element EL1, a second light-emitting element EL2, and a compensation circuit 10. The compensation circuit 10 may include, but not limited to, a first capacitor C1, and third to eighth switch elements M3 to M8.

The display device of the present disclosure may further include MUX switch elements M9 and M10 connected to the data lines DL1 and DL2.

The first mode selection circuit 22 may be connected to the fourth node n4 and the sixth node n6 of the first sub-pixel PXL1, and the first power line to which the pixel driving voltage EVDD is applied. The first mode selection circuit 22 may include a first mode switch element T1, a second mode switch element T2, and a second capacitor C2.

The second capacitor C2 is connected between the sixth node n6 and the first power line, and stores the first mode selection voltage S when the first and second mode switch elements T1 and T2 are turned on. The first electrode of the second capacitor C2 is connected to the sixth node n6. The second electrode of the second capacitor C2 is connected to the first power line to which the pixel driving voltage EVDD is applied. The capacity of the second capacitor C2 may be greater than or equal to that of the first capacitor C1.

The second mode selection circuit 24 may be connected to the fourth node n4 and the seventh node n7 of the second sub-pixel PXL2, and the first power line to which the pixel driving voltage EVDD is applied. The second mode selection circuit 24 may include a third mode switch element T3, a fourth mode switch element T4, and a third capacitor C3.

The third capacitor C3 is connected between the seventh node n7 and the first power line, and stores the second mode selection voltage P when the third and fourth mode switch elements T3 and T4 are turned on. The first electrode of the third capacitor C3 is connected to the seventh node n7. The second electrode of the third capacitor C3 is connected to the first power line to which the pixel driving voltage EVDD is applied. The capacity of the third capacitor C3 may be greater than or equal to that of the first capacitor C1 and may be equal to that of the second capacitor C2.

The operation of the pixel circuit shown in FIG. 11 is similar to FIGS. 7A to 10B except that the reference voltage for the second and third capacitors C2 and C3 is changed to the pixel driving voltage EVDD, and a detailed description thereof will be omitted.

Figure 12A:
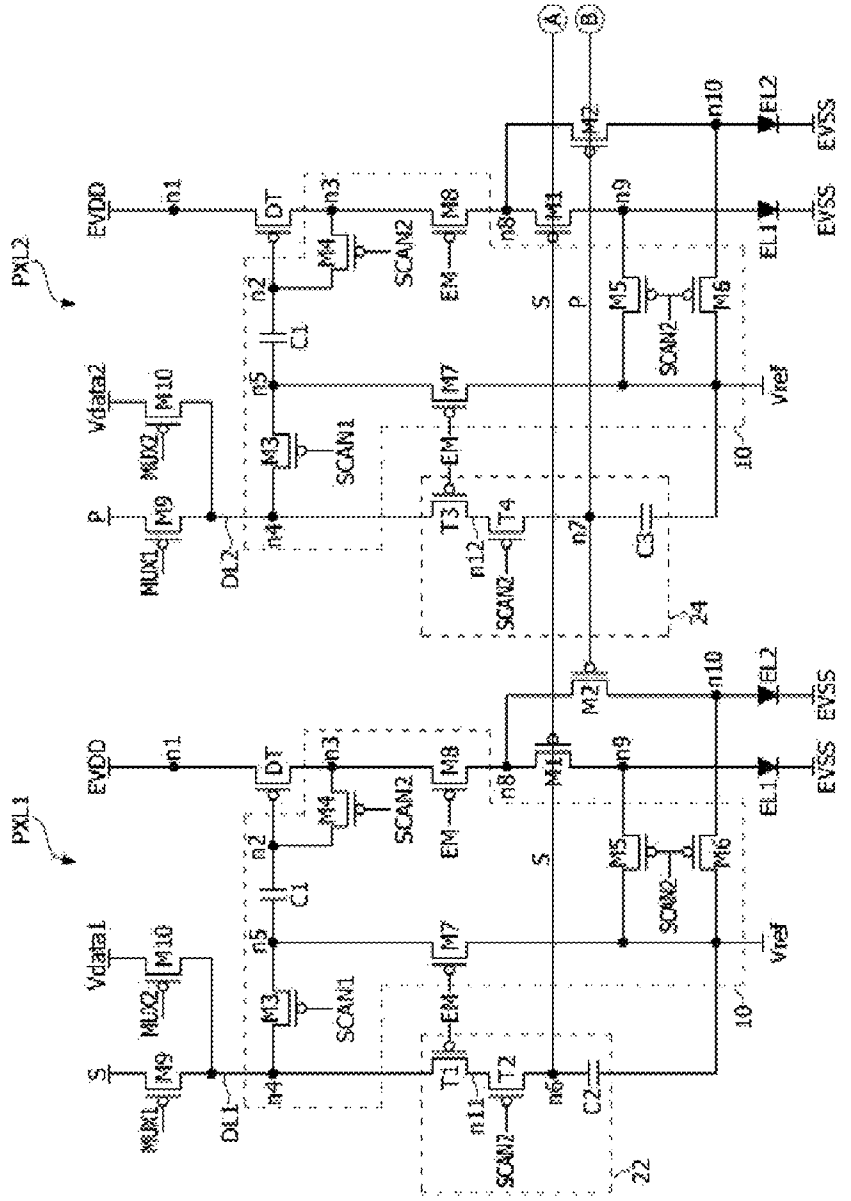
FIGS. 12A and 12B are circuit diagrams showing an example of first to fourth sub-pixels arranged in one pixel line.
Figure 12B:
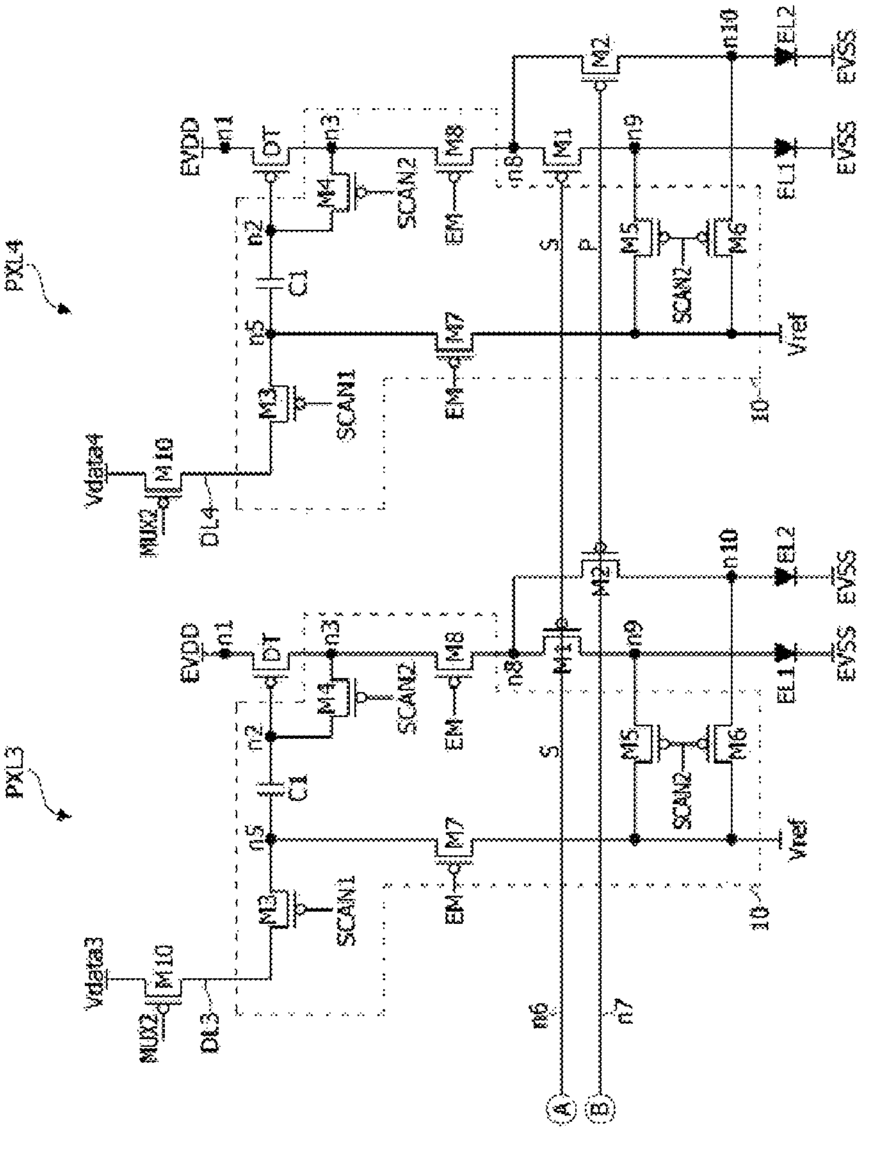

FIGS. 12A and 12B are circuit diagrams showing an example of the first to fourth sub-pixels PXL1 to PXL4 arranged on one pixel line. In FIGS. 12A and 12B, the sixth nodes n6 of the second sub-pixel PXL2 and the third sub-pixel PXL3 are connected at 'A.' The seventh nodes n7 of the second sub-pixel PXL2 and the third sub-pixel PXL3 are connected at 'B.' In the pixel circuit shown in FIGS. 12A and 12B, elements that are substantially the same as those in the pixel circuit shown in FIG. 4 will be given the same reference symbols and a detailed description thereof will be omitted. One frame period of the pixel circuit shown in FIGS. 12A and 12B is divided into an initialization period INI, a sampling period SAM, and an emission period EMIS as shown in FIGS. 5 and 6. When the signals shown in FIG. 5 are applied to the first to fourth sub-pixels PXL1 to PXL4 shown in FIGS. 12A and 12B, the first to fourth sub-pixels PXL1 to PXL4 operate in first mode. When the signals shown in FIG. 6 are applied to the first to fourth sub-pixels PXL1 to PXL4 shown in FIGS. 12A and 12B, the first to fourth sub-pixels PXL1 to PXL4 operate in second mode.

With reference to FIGS. 12A and 12B, the pixel circuit of the first sub-pixel PXL1 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, a second switch element M2 connected between the driving element DT and the second light-emitting element EL2, and a first mode selection circuit 22 that receives a first mode selection voltage S to drive the first switch elements M1 of the first to fourth sub-pixels PXL1 to PXL4.

The pixel circuit of the second sub-pixel PXL2 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, a second switch element M2 connected between the driving element DT and the second light-emitting element EL2, and a second mode selection circuit 24 that receives a second mode selection voltage P to drive the second switch elements M2 of the first to fourth sub-pixels PXL1 to PXL4.

The pixel circuit of each of the third and fourth sub-pixels PXL3 and PXL4 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, and a second switch element M2 connected between the driving element DT and the second light-emitting element EL2. The pixel circuits of the third and fourth sub-pixels PXL3 and PXL4 may be connected to the mode selection circuits 22 and 24 of the first and second sub-pixels PXL1 and PXL2 without a separate mode selection circuit.

The first mode selection circuit 22 may be connected to the sixth node n6 of the first to fourth sub-pixels PXL1 to PXL4 to drive the first switch elements M1. The second mode selection circuit 24 may be connected to the seventh node n7 of the first to fourth sub-pixels PXL1 to PXL4 to drive the second switch elements M2 of the first to fourth sub-pixels PXL1 to PXL4.

Figure 13A:
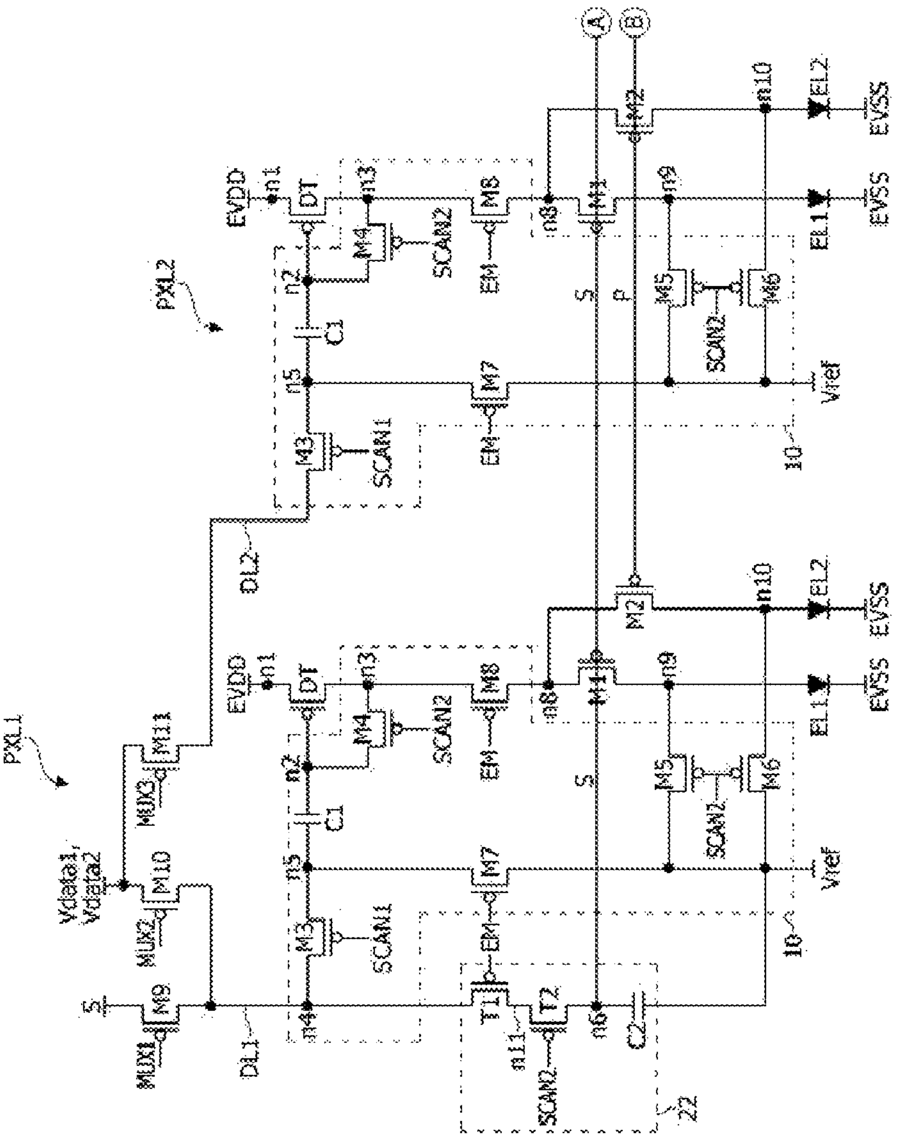
FIGS. 13A and 13B are circuit diagrams showing another example of first to fourth sub-pixels arranged in one pixel line.
Figure 13B:
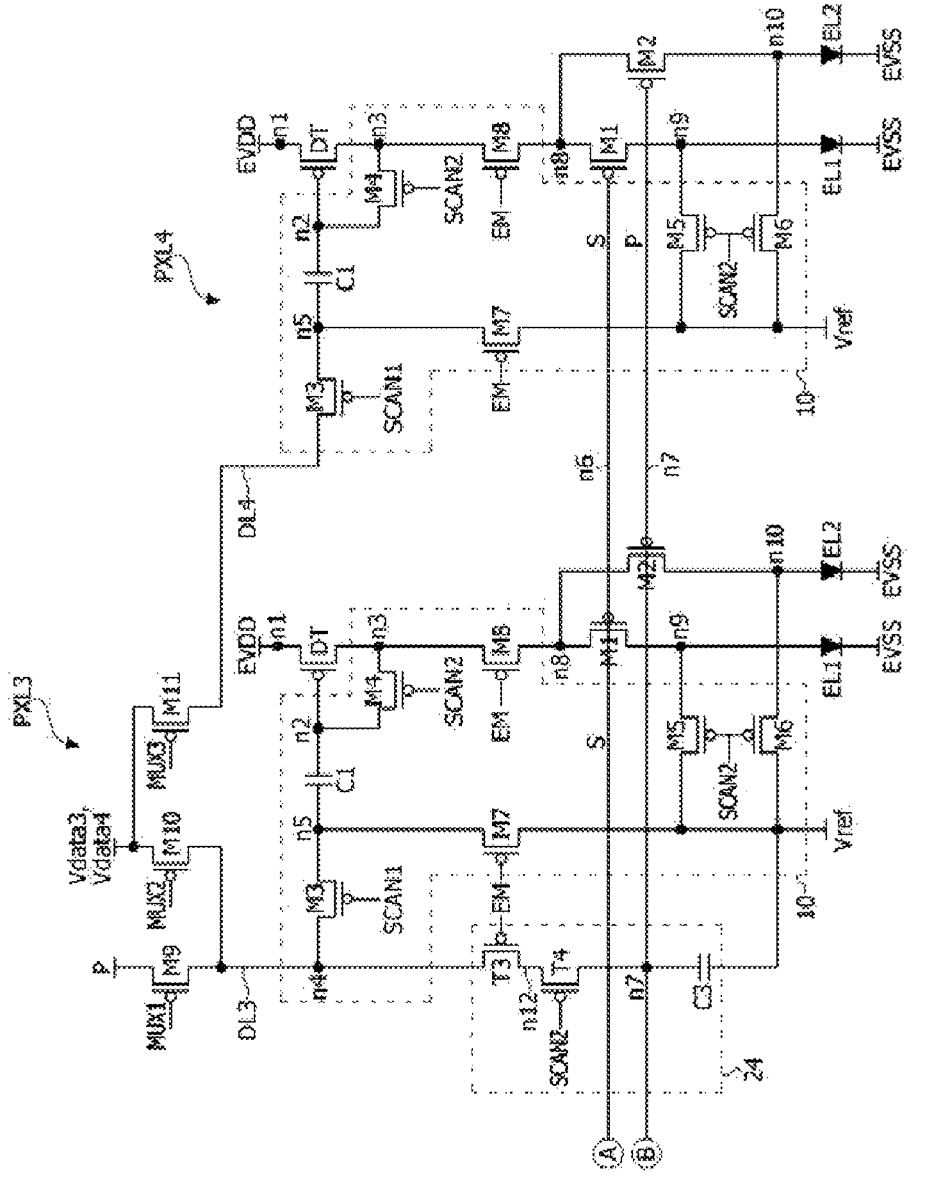

FIGS. 13A and 13B are circuit diagrams showing another example of the first to fourth sub-pixels PXL1 to PXL4 arranged on one pixel line. In FIGS. 13A and 13B, the sixth nodes n6 of the second sub-pixel PXL2 and the third sub-pixel PXL3 are connected at 'A.' The seventh nodes n7 of the second sub-pixel PXL2 and the third sub-pixel PXL3 are connected at 'B.' In the pixel circuit shown in FIGS. 13A and 13B, elements that are substantially the same as those in the pixel circuit shown in FIG. 4 will be given the same reference symbols and a detailed description thereof will be omitted. One frame period of the pixel circuit shown in FIGS. 13A and 13B is divided into an initialization period INI, a sampling period SAM, and an emission period EMIS as shown in FIGS. 5 and 6. The signals shown in FIG. 14 may be applied to the first to fourth sub-pixels PXL1 to PXL4 shown in FIGS. 13A and 13B.

With reference to FIGS. 13A and 13B, the display device of the present disclosure may further include first to third MUX switch elements M9, M10 and M11 connected to the data lines DL1 to DL4. The first to third MUX switch elements M9, M10 and M11 may be arranged in the non-display area NA of the display panel 100 or may be embedded in an integrated circuit (IC) in which the circuit of the data driver 110 is integrated.

The first sub-pixel PXL1 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, a second switch element M2 connected between the driving element DT and the second light-emitting element EL2, and a first mode selection circuit 22 that receives a first mode selection voltage S to drive the first switch elements M1 of the first to fourth sub-pixels PXL1 to PXL4.

The third sub-pixel PXL3 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, a second switch element M2 connected between the driving element DT and the second light-emitting element EL2, and a second mode selection circuit 24 that receives a second mode selection voltage P to drive the second switch elements M2 of the sub-pixels PXL1 to PXL4.

The pixel circuit of each of the second and fourth sub-pixels PXL2 and PXL4 includes a first light-emitting element EL1, a second light-emitting element EL2, a driving element DT that drives the first and second light-emitting elements EL1 and EL2, a compensation circuit 10 connected to the driving element DT, a first switch element M1 connected between the driving element DT and the first light-emitting element EL1, and a second switch element M2 connected between the driving element DT and the second light-emitting element EL2. Since the pixel circuits of the second and fourth sub-pixels PXL2 and PXL4 share the mode selection circuits 22 and 24 of other sub-pixels arranged in the same pixel circuit, they do not need to be connected to a separate mode selection circuit.

The first mode selection circuit 22 may be connected to the sixth node n6 of the first to fourth sub-pixels PXL1 to PXL4 to drive the first switch elements M1. The second mode selection circuit 24 may be connected to the seventh node n7 of the first to fourth sub-pixels to drive the second switch elements M2 of the first to fourth sub-pixels PXL1 to PXL4.

The first channel of the data driver 110 may output the first data voltage Vdata1 and the second data voltage Vdata2 in sequence. The second channel of the data driver 110 may output the third data voltage Vdata3 and the fourth data voltage Vdata4 in sequence.

The fourth node n4 of the first sub-pixel PXL1 is connected to the first data line DL1 as shown in FIG. 13A. When the first MUX switch element M9 connected to the first sub-pixel PXL1 is turned on, the first mode selection voltage S is applied to the first data line DL1. The first data voltage Vdata1 is applied to the first data line DL1 when the second MUX switch element M10 connected to the first sub-pixel PXL1 is turned on. The second data voltage Vdata2 is applied to the second data line DL2 when the third MUX switch element M11 connected to the second sub-pixel PXL2 is turned on.

The first MUX switch element M9 connected to the first sub-pixel PXL1 includes a first electrode to which the first mode selection voltage S is applied, a gate electrode to which the first MUX signal MUX1 is applied, and a second electrode connected to the first data line DL1. The first MUX switch element M9 is turned on in response to the gate-on voltage VGL of the first MUX signal MUX1.

The second MUX switch element M10 connected to the first sub-pixel PXL1 includes a first electrode connected to the first channel of the data driver 110, a gate electrode to which the second MUX signal MUX2 is applied, and a second electrode connected to the first data line DL1. The second MUX switch element M10 is turned on in response to the gate-on voltage VGL of the second MUX signal MUX2.

The third MUX switch element M11 connected to the second sub-pixel PXL2 includes a first electrode connected to the first channel of the data driver 110, a gate electrode to which the third MUX signal MUX3 is applied, and a second electrode connected to the second data line DL2. The third MUX switch element M11 is turned on in response to the gate-on voltage VGL of the third MUX signal MUX3.

The fourth node n4 of the third sub-pixel PXL3 is connected to the third data line DL3 as shown in FIG. 13B. When the first MUX switch element M9 connected to the third sub-pixel PXL3 is turned on, the second mode selection voltage P is applied to the third data line DL3. The third data voltage Vdata3 is applied to the third data line DL3 when the second MUX switch element M10 connected to the third sub-pixel PXL3 is turned on. The fourth data voltage Vdata4 is applied to the fourth data line DL4 when the third MUX switch element M11 connected to the fourth sub-pixel PXL4 is turned on.

The first MUX switch element M9 connected to the third sub-pixel PXL3 includes a first electrode to which the second mode selection voltage P is applied, a gate electrode to which the first MUX signal MUX1 is applied, and a second electrode connected to the third data line DL3. The first MUX switch element M9 is turned on in response to the gate-on voltage VGL of the first MUX signal MUX1.

The second MUX switch element M10 connected to the third sub-pixel PXL3 includes a first electrode connected to the second channel of the data driver 110, a gate electrode to which the second MUX signal MUX2 is applied, and a second electrode connected to the third data line DL3. The second MUX switch element M10 is turned on in response to the gate-on voltage VGL of the second MUX signal MUX2.

The third MUX switch element M11 connected to the fourth sub-pixel PXL4 includes a first electrode connected to the second channel of the data driver 110, a gate electrode to which the third MUX signal MUX3 is applied, and a second electrode connected to the fourth data line DL4. The third MUX switch element M11 is turned on in response to the gate-on voltage VGL of the third MUX signal MUX3.

Figure 14:
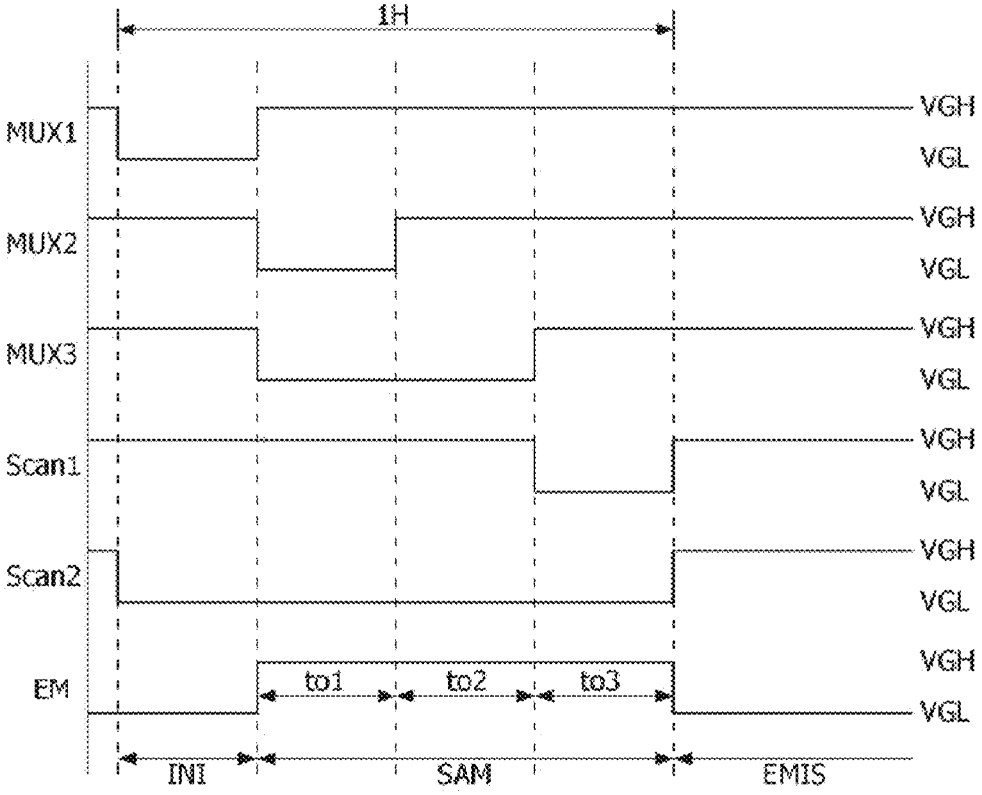
FIG. 14 is a waveform diagram showing an example of gate signals input to the pixel circuits shown in FIGS. 13A and 13B and MUX signals applied to MUX switch elements.

One frame period of the sub-pixels PXL1 to PXL4 shown in FIGS. 13A and 13B may be divided into an initialization period INI, a sampling period SAM, and an emission period EMIS as shown in FIG. 14. In FIG. 14, '1H' indicates one horizontal period. As shown in FIG. 14, the sampling period SAM may be divided into a first sampling period t01, a second sampling period t02, and a third sampling period t03. The initialization period INI, the sampling period SAM, and the emission period EMIS may be controlled by the waveforms of the gate signals SCAN1, SCAN2 and EM. The gate signals SCAN1, SCAN2 and EM may be generated at the same timing in first and second modes. The MUX signals MUX1, MUX2 and MUX3 may be generated at the same timing in first and second modes.

FIG. 14 is a waveform diagram showing an example of gate signals input to the pixel circuits and MUX signals applied to MUX switch elements shown in FIGS. 13A and 13B. In FIG. 14, the first and second mode selection voltages S and P are not shown. The first mode selection voltage S and the second mode selection voltage P may be generated in each mode as shown in Table 1. In first mode, the first mode selection voltage S is a gate-on voltage VGL, while the second mode selection voltage P is a gate-off voltage VGH. In second mode, the first mode selection voltage S is a gate-off voltage VGH, while the second mode selection voltage P is a gate-on voltage VGL.

With reference to FIGS. 13A, 13B and 14, during the initialization period, the voltages of the first MUX signal MUX1, second gate signal SCAN2, and third gate signal EM have a gate-on voltage VGL, and the voltages of the second and third MUX signals MUX2 and MUX3 and first gate signal SCAN1 have a gate-off voltage VGH. Hence, during the initialization period INI, the fourth to eighth switch elements M4 to M8, the first MUX switch element M9, and the mode switch elements T1 to T4 are turned on, while the third switch element M3 and the second and third MUX switch elements M10 and M11 are turned off.

In the initialization period INI in first mode, the first switch element M1 is turned on in response to the gate-on voltage VGL of the first mode selection voltage S, while the second switch element M2 is turned off in response to the gate-off voltage VGH of the second mode selection voltage P. In the initialization period INI in second mode, the second switch element M2 is turned on in response to the gate-on voltage VGL of the second mode selection voltage P, while the first switch element M1 is turned off in response to the gate-off voltage VGH of the first mode selection voltage S.

During the sampling period SAM in first mode, the first mode selection voltage S is a gate-on voltage VGL, and the second mode selection voltage P is a gate-off voltage VGH. Hence, during the sampling period SAM in first mode, the first switch element M1 is in an on state, and the second switch element M2 is in an off state. During the sampling period SAM in second mode, the first mode selection voltage S is a gate-off voltage VGH, and the second mode selection voltage P is a gate-on voltage VGL. Hence, during the sampling period SAM in second mode, the first switch element M1 is in an off state, and the second switch element M2 is in an on state.

During the first sampling period t01, the voltages of the second and third MUX signals MUX2 and MUX3 and second gate signal SCAN2 are a gate-on voltage VGL. During the first sampling period t01, the voltages of the first MUX signal MUX1, first gate signal SCAN1, and third gate signal EM are a gate-off voltage VGH. Hence, during the first sampling period t01, the fourth to sixth switch elements M4, M5 and M6, second MUX switch element M10, third MUX switch element M11, second mode switch element T2, and fourth mode switch element T4 are turned on. During the first sampling period t01, the third switch element M3, seventh switch element M7, eighth switch element M8, first MUX switch element M9, first mode switch element T1, and third mode switch element T3 are turned off.

During the second sampling period t02, the voltages of the third MUX signal MUX3 and second gate signal SCAN2 are a gate-on voltage VGL. During the second sampling period t02, the voltages of the first MUX signal MUX1, second MUX signal MUX2, first gate signal SCAN1, and third gate signal EM are a gate-off voltage VGH. Hence, during the second sampling period t02, the fourth to sixth switch elements M4, M5 and M6, third MUX switch element M11, second mode switch element T2, and fourth mode switch element T4 are turned on. During the second sampling period t02, the third switch element M3, seventh switch element M7, eighth switch element M8, first MUX switch element M9, second MUX switch element M10, first mode switch element T1, and third mode switch element T3 are turned off.

During the third sampling period t03, the voltages of the first and second gate signals SCAN1 and SCAN2 are a gate-on voltage VGL. During the third sampling period t03, the voltages of the MUX signals MUX1, MUX2 and MUX3 and third gate signal EM are a gate-off voltage VGH. Hence, during the third sampling period t03, the third to sixth switch elements M3, M4, M5 and M6, second mode switch element T2, and fourth mode switch element T4 are turned on. During the third sampling period t03, the seventh switch element M7, eighth switch element M8, MUX switch elements M9, M10 and M11, first mode switch element T1, and third mode switch element T3 are turned off.

During the sampling period SAM, the data voltages Vdata1 to Vdata4 of the pixel data are charged to the data lines DL1 to DL4 through the second and third MUX switch elements M10 and M11, and the second node n2 is charged with the pixel driving voltage EVDD through the driving element DT. During the sampling period SAM, when the gate voltage of the driving element DT rises and the gate-source voltage Vgs of the driving element DT reaches the threshold voltage Vth, the driving element DT is turned off.

During the emission period EMIS in first mode, the first mode selection voltage S is a gate-on voltage VGL, and the second mode selection voltage P is a gate-off voltage VGH. Hence, during the emission period EMIS in first mode, the first switch element M1 is in an on state, and the second switch element M2 is in an off state. During the emission period EMIS in second mode, the first mode selection voltage S is a gate-off voltage VGH, and the second mode selection voltage P is a gate-on voltage VGL. Hence, during the emission period EMIS in second mode, the first switch element M1 is in an off state, and the second switch element M2 is in an on state.

During the emission period EMIS, the voltage of the third gate signal EM is a gate-on voltage VGL, and the voltages of the first and second gate signals SCAN1 and SCAN2 and MUX signals MUX1 and MUX2 are a gate-off voltage VGH. Hence, during the emission period EMIS, the seventh switch element M7, eighth switch element M8, first mode switch element T1, and third mode switch element T3 are turned on. During the emission period EMIS, the third to sixth switch elements M3 to M6, MUX switch elements M9 and M10, second mode switch element T2, and fourth mode switch element T4 are turned off.

When the first and second sub-pixels PXL1 and PXL2 shown in FIG. 13A operate in first mode, since the first switch elements M1 maintain an on state during the emission period EMIS, a current flows between the pixel driving voltage EVDD and the cathode voltage EVSS, so that the first light-emitting element EL1 may emit light. At this time, since the second switch element M2 is in an off state, the second light-emitting element EL2 does not emit light.

When the first and second sub-pixels PXL1 and PXL2 operate in second mode, since the second switch elements M2 maintain an on state during the emission period EMIS, a current flows between the pixel driving voltage EVDD and the cathode voltage EVSS, so that the second light-emitting element EL2 may emit light. At this time, since the first switch element M1 is in an off state, the first light-emitting element EL1 does not emit light.

When the third and fourth sub-pixels PXL3 and PXL4 shown in FIG. 13B operate in first mode, since the first switch elements M1 maintain an on state during the emission period EMIS, a current flows between the pixel driving voltage EVDD and the cathode voltage EVSS, so that the first light-emitting element EL1 may emit light. At this time, since the second switch element M2 is in an off state, the second light-emitting element EL2 does not emit light.

When the third and fourth sub-pixels PXL3 and PXL4 operate in second mode, since the second switch elements M2 maintain an on state during the emission period EMIS, a current flows between the pixel driving voltage EVDD and the cathode voltage EVSS, so that the second light-emitting element EL2 may emit light. At this time, since the first switch element M1 is in an off state, the first light-emitting element EL1 does not emit light.

The data driver 110 may output the mode selection voltages S and P and the data voltage Vdata in sequence through channels electrically connected to the compensation circuit 10 and the mode selection circuits 22 and 24. In this case, since the mode selection voltages S and P and data voltage Vdata output from the data driver 110 may be directly supplied to the data lines, MUX switch elements may be omitted.

Figure 15A:
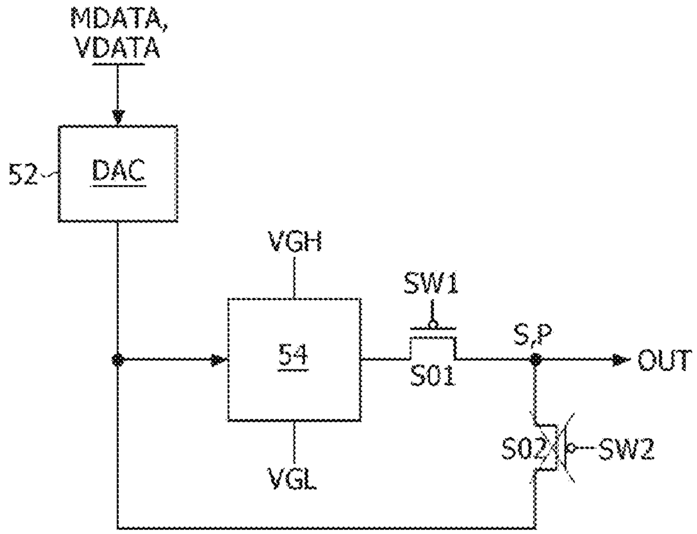
FIGS. 15A and 15B are circuit diagrams showing an example of a channel in the data driver that outputs a mode selection voltage and a data voltage.
Figure 15B:
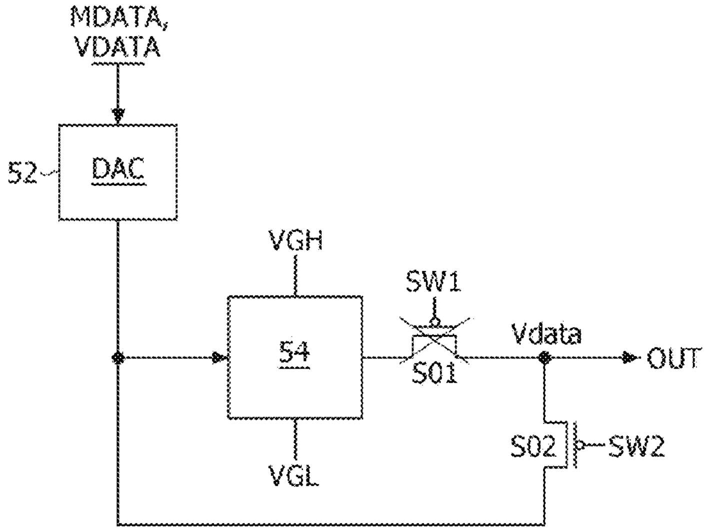
Figure 16:
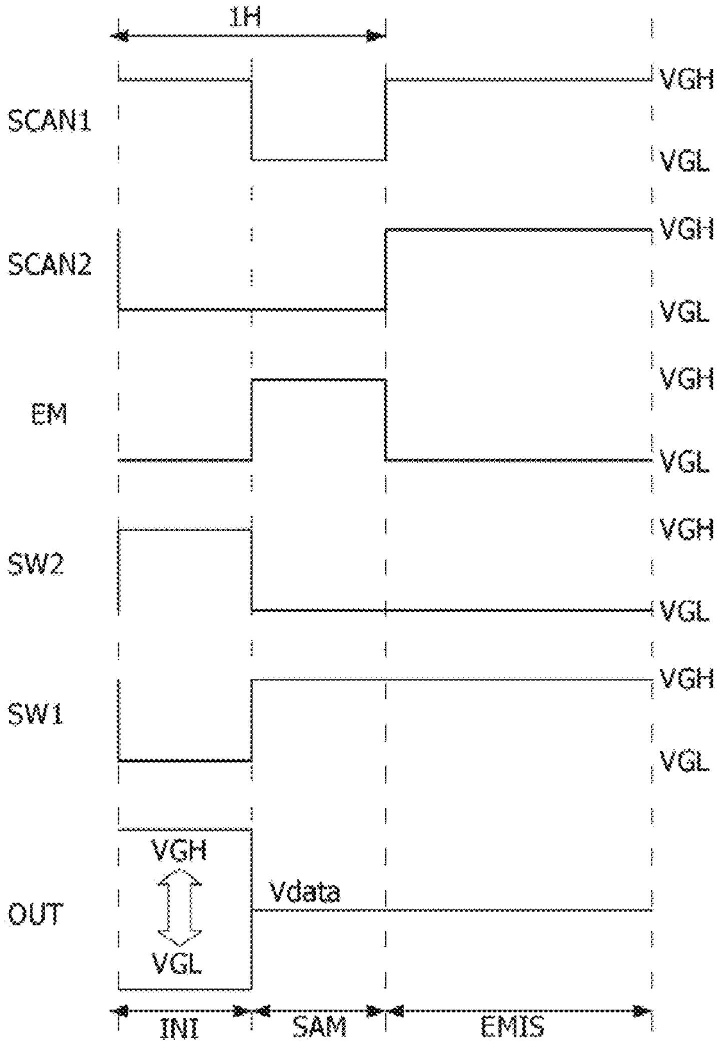
FIG. 16 is a waveform diagram showing an example of voltages output from a channel of the data driver shown in FIGS. 15A and 15B.

FIGS. 15A and 15B are circuit diagrams showing an example of a channel that outputs a mode selection voltage and a data voltage from the data driver 110. FIG. 16 is a waveform diagram showing an example of voltages output from a channel of the data driver 110 shown in FIGS. 15A and 15B. FIGS. 15A to 16, 'OUT' is the output voltage of the data driver 110.

With reference to FIGS. 15A and 15B, the data driver 110 includes a DAC 52, a mode selection voltage generator 54, a first output switch element S01, and a second output switch element S02. The mode selection voltage generator 54 may output the first and second mode selection voltages S and P by using, but not limited to, a level shifter that shifts the input voltage level.

The timing controller 130 shown in FIG. 1 may transmit digital data MDATA indicating the first and second modes and pixel data (digital data) VDATA of the input image to the data driver 110. The logic circuit or timing controller 130 of the data driver 110 may generate switch control signals SW1 and SW2 to control the output switch elements S01 and S02 shown in FIGS. 15A and 15B.

The DAC 52 of the data driver 110 converts the digital data MDATA received from the timing controller 130 into a gamma compensation voltage. When the dynamic range of the data voltage Vdata output from the data driver 110 is 2V to 7V, the DAC may output a first voltage between 2V and 4V if the digital data MDATA indicates a low logic voltage, and output a second voltage between 6V and 7V if the digital data MDATA indicates a high logic voltage. The mode selection voltage generator 54 may output a gate-on voltage VGL when the output voltage of the DAC 52 is a first voltage, and output a gate-off voltage VGH when the output voltage of the DAC 52 is a second voltage.

The DAC 52 converts the pixel data VDATA received from the timing controller 130 into a gamma compensation voltage. Within a dynamic range between 2V and 7V, a voltage corresponding to the grayscale value of the pixel data VDATA may be output from the DAC 52.

With reference to FIGS. 15A and 16, during the initialization period INI, the first output switch element S01 is turned on in response to the on voltage level of a first switch signal SW1, while the second output switch element S02 is turned off in response to the off voltage level of a second switch signal SW2. Hence, during the initialization period INI, the mode selection voltages S and P from the mode selection voltage generator 54 may be output from the data driver 110.

With reference to FIGS. 15B and 16, during the sampling period SAM and the emission period EMIS, the first output switch element S01 is turned off in response to the off voltage level of the first switch signal SW1, while the second output switch element S02 is turned on in response to the on voltage level of the second switch signal SW2. Hence, during the sampling period SAM and the emission period EMIS, the data voltage Vdata from the DAC may be output from the data driver 110.

Figure 17:
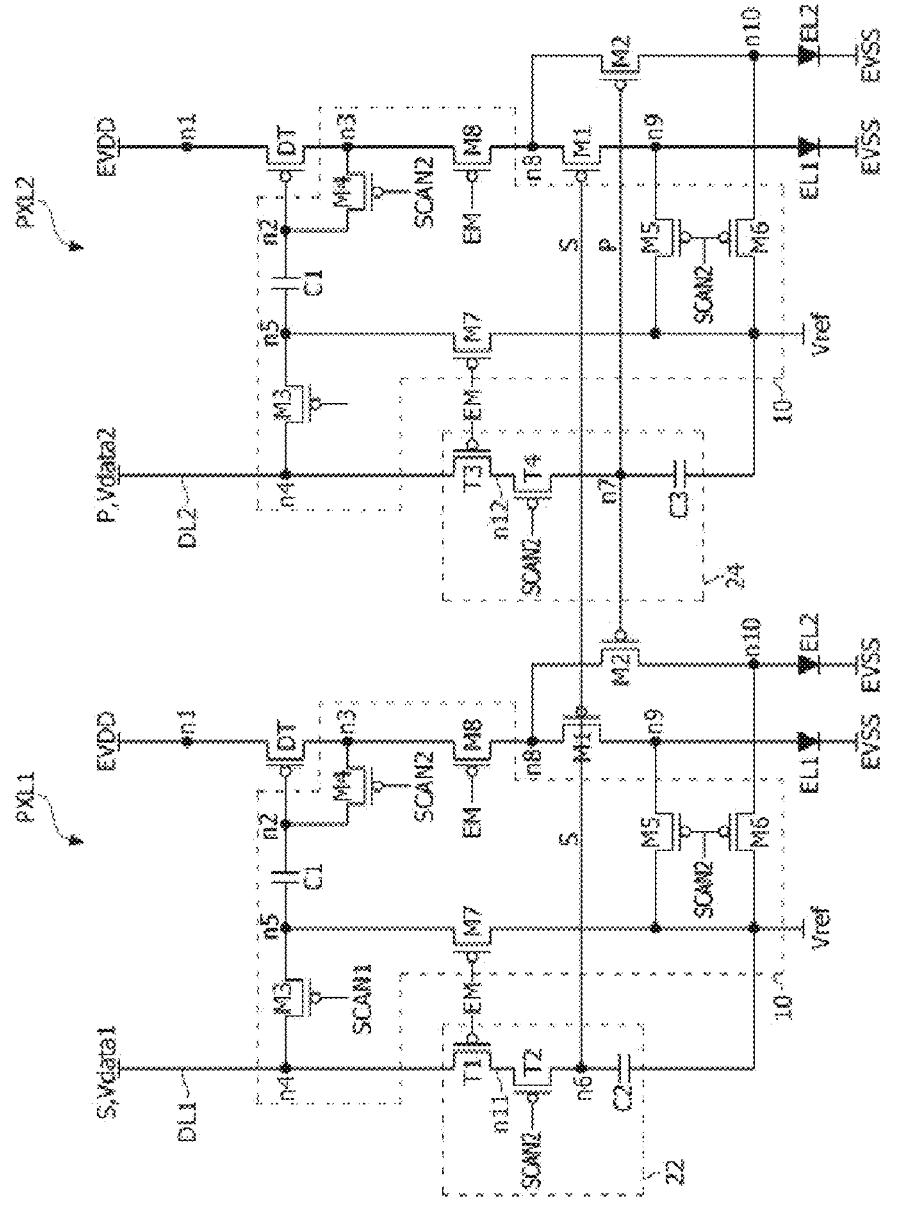
FIG. 17 is a circuit diagram showing a pixel circuit of sub-pixels in which a mode selection voltage and a data voltage are supplied to data lines without MUX switch elements.

The mode selection voltages S and P and data voltage Vdata output from the data driver 110 may be directly supplied to the data lines as shown in FIG. 17.

With reference to FIG. 17, the first sub-pixel PXL1 is connected to the first data line DL1. The first channel of the data driver 110 may be connected to the first data line DL1. The first mode selection voltage S and the first data voltage Vdata1 output from the first channel of the data driver 110 may be applied in sequence to the first data line DL1.

The first sub-pixel PXL1 may include a first mode selection circuit 22. The first mode selection circuit 22 charges the second capacitor C2 with the first mode selection voltage S received during the initialization period INI to drive multiple first switch elements M1 connected to the sixth node n6. The first data voltage Vdata1 may be applied to the first capacitor C1 and the gate electrode of the driving element DT through the third switch element M3 during the sampling period SAM.

The second sub-pixel PXL2 is connected to the second data line DL2. The second channel of the data driver 110 may be connected to the second data line DL2. The second mode selection voltage P and the second data voltage Vdata2 output from the second channel of the data driver 110 may be applied in sequence to the second data line DL2.

The second sub-pixel PXL2 may include a second mode selection circuit 24. The second mode selection circuit 24 charges the third capacitor C3 with the second mode selection voltage P received during the sampling period SAM to drive multiple second switch elements M2 connected to the seventh node n7. The second data voltage Vdata2 may be applied to the first capacitor C1 and the gate electrode of the driving element DT through the third switch element M3 during the sampling period SAM.

Meanwhile, the mode selection circuits 22 and 24 may not only be shared by a plurality of sub-pixels arranged in one pixel line as in the above-described embodiments, but may also be shared between pixel lines. For example, the mode selection circuits 22 and 24 may vary the viewing angle of two or more sub-pixels arranged on one pixel line and may also vary the viewing angle of two or more sub-pixels arranged on two or more pixel lines.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting lighting devices or inorganic light emitting lighting devices.

The technical features of the present disclosure, the means for achieving the technical features, and effects of the present disclosure described above do not exhaust all the features that are covered by the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel comprising:

a first data line to which a first data voltage and a first mode selection voltage are configured to be applied;

a second data line to which a second data voltage and a second mode selection voltage are configured to be applied;

a plurality of sub-pixels including at least a first sub-pixel and a second sub-pixel;

a first mode selection circuit configured to select a first viewing angle as a viewing angle of the first sub-pixel and the second sub-pixel based on the first mode selection voltage received through the first data line; and a second mode selection circuit configured to select a second viewing angle as a viewing angle of the first sub-pixel and the second sub-pixel based on the second mode selection voltage received through the second data line, the second viewing angle different from the first viewing angle, wherein:

each of the sub-pixels includes:

a first light-emitting element configured to emit light in a first mode;

a second light-emitting element configured to emit light in a second mode;

a driving element configured to drive the first and second light-emitting elements;

a compensation circuit including a first capacitor connected to the driving element;

a first switch element that is electrically connected to the driving element and the first light-emitting element and is configured to be driven by the first mode selection voltage; and a second switch element that is electrically connected to the driving element and the second light-emitting element and is configured to be driven by the second mode selection voltage, the first mode selection circuit includes a first mode switch element electrically connected to the first data line, a second capacitor that is connected to gate electrodes of the first switch elements arranged in the first and second sub-pixels to receive the first mode selection voltage, and a second mode switch element connected between the first mode switch element and the second capacitor; and the second mode selection circuit includes a third mode switch element electrically connected to the second data line, a third capacitor that is connected to gate electrodes of the second switch elements arranged in the first and second sub-pixels to receive the second mode selection voltage, and a fourth mode switch element connected between the third mode switch element and the third capacitor.

2. The display panel of claim 1, wherein:

the first light-emitting element emits light when the first switch element is turned on in response to a gate-on voltage of the first mode selection voltage;

the second light-emitting element emits light when the second switch element is turned on in response to a gate-on voltage of the second mode selection voltage;

the first switch element is turned off according to a gate-off voltage of the first mode selection voltage; and the second switch element is turned off according to a gate-off voltage of the second mode selection voltage.

3. The display panel of claim 2, further comprising:

a first-first MUX switch element that is connected to the first data line to supply the first mode selection voltage to the first data line;

a first-second MUX switch element that is connected to the first data line to supply to the first data line the first data voltage to charge the first capacitor of the first sub-pixel;

a second-first MUX switch element that is connected to the second data line to supply the second mode selection voltage to the second data line; and a second-second MUX switch element that is connected to the second data line to supply to the second data line the second data voltage to charge the first capacitor of the second sub-pixel.

4. The display panel of claim 3, wherein after the first-first MUX switch element and the second-first MUX switch element are simultaneously turned on in response to a gate-on voltage of a first MUX signal, the first-second MUX switch element and the second-second MUX switch element are simultaneously turned on in response to a gate-on voltage of a second MUX signal.

* * * * *